United States Patent
Ackerman

(10) Patent No.: US 9,141,931 B2
(45) Date of Patent: Sep. 22, 2015

(54) INVENTORY DISTRIBUTION METHOD AND SYSTEM

(71) Applicant: Amazon Technologies, Inc., Reno, NV (US)

(72) Inventor: Neil Scott Ackerman, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/038,712

(22) Filed: Sep. 26, 2013

(65) Prior Publication Data

US 2015/0088307 A1 Mar. 26, 2015

(51) Int. Cl.
*G06F 7/00* (2006.01)
*G06Q 10/08* (2012.01)

(52) U.S. Cl.
CPC .................................... *G06Q 10/087* (2013.01)

(58) Field of Classification Search
USPC ......................................................... 700/214
See application file for complete search history.

(56) References Cited

U.S. PATENT DOCUMENTS

| | | | |
|---|---|---|---|
| 5,158,155 A | 10/1992 | Domain et al. | |
| 5,431,250 A | 7/1995 | Schlamp | |
| 5,482,139 A | 1/1996 | Rivalto | |
| 6,439,345 B1 | 8/2002 | Recktenwald et al. | |
| 6,866,195 B2 | 3/2005 | Knowles et al. | |
| 2002/0072974 A1 | 6/2002 | Pugliese, III et al. | |
| 2002/0077937 A1 | 6/2002 | Lyons et al. | |
| 2002/0143655 A1 | 10/2002 | Elston et al. | |
| 2003/0216969 A1 | 11/2003 | Bauer et al. | |
| 2005/0165647 A1* | 7/2005 | Razumov | 705/26 |
| 2005/0216354 A1 | 9/2005 | Bam et al. | |
| 2006/0254862 A1 | 11/2006 | Hoersten | |
| 2009/0043617 A1* | 2/2009 | Thomas | 705/7 |
| 2010/0268792 A1 | 10/2010 | Butler et al. | |
| 2011/0288958 A1 | 11/2011 | Obasanjo et al. | |
| 2011/0320037 A1 | 12/2011 | Frugone | |
| 2011/0320318 A1 | 12/2011 | Patel et al. | |
| 2012/0130916 A1 | 5/2012 | Neal et al. | |
| 2013/0231776 A1 | 9/2013 | Kuehnrich et al. | |
| 2013/0256403 A1 | 10/2013 | MacKinnon Keith | |
| 2013/0262251 A1 | 10/2013 | Wan et al. | |
| 2014/0039998 A1* | 2/2014 | Hancock et al. | 705/14.23 |
| 2014/0244411 A1 | 8/2014 | Kim et al. | |

OTHER PUBLICATIONS

U.S. Appl. No. 14/038,714, filed Sep. 26, 2013, Titled: "Mobile Transactions With a Kiosk Management System".

(Continued)

*Primary Examiner* — Gene Crawford
*Assistant Examiner* — Kyle Logan
(74) *Attorney, Agent, or Firm* — Kilpatrick Townsend & Stockton LLP

(57) ABSTRACT

An inventory distribution system and method of providing a plurality of items to a plurality of kiosks is provided. The inventory distribution system may maintain and update a plurality of inventory records associated with the plurality of items provided by the plurality of kiosks, which can be used to determine and update quantities of the plurality of items at specific kiosks. To provide the plurality of items to the plurality of kiosks, the inventory distribution system can provide deliveries to a plurality of distribution agents, where the distribution agents are assigned to a subset of kiosks to maintain and distribute one or more select items to the subset of kiosks.

19 Claims, 23 Drawing Sheets

(56) References Cited

OTHER PUBLICATIONS

U.S. Appl. No. 14/038,706, filed Sep. 26, 2013, Titled: Kiosk Management System.

U.S. Appl. No. 14/038,710, filed Sep. 26, 2013, Titled: Kiosk Network in a Kiosk Management System.

U.S. Appl. No. 14/078,714, filed Sep. 26, 2013, Titled: Mobile Transactions With a Kiosk Management System.

Abcede, Angel. @Best Buy uses kiosks to sell upscale devices at c-stores, including Murphy Express. [online] CSP Daily News, Jan. 2012 [retrieved Oct. 3, 2013]. Retrieved from the Internet: <URL: http://www.cspnet.com/industry-news-analysis/technology/articles/vending-electronics>.

Lee, Nicole. Google buys BufferBox, might give Amazon Locker a run for its money. [online] Engadget.com, Nov. 2012 [retrieved Oct. 4, 2013]. Retrieved from the Internet: <URL: http://www.engadget.com/2012/11/30/google-buys-bufferbox-lockers-online-purchases/>.

Maras, Elliot. Best Buy Tests Consumer Electronics Vending Machines in Convenience Stores. [online] Vending Marketwatch.com, Jan. 2012 [retrieved Oct. 3, 2013]. Retrieved from the Internet: <URL: http://www.vendingmarketwatch.com/news/10604771/best-buy-tests-consumer-electronics-vending-machines-in-convenience-stores>.

Melanson, Donald. Google's first batch of BufferBox delivery lockers arrives in San Francisco. [online] Engadget.com, Sep. 30, 2013 [retrieved Oct. 4, 2013]. Retrieved from the Internet: <URL: http://www.engadget.com/2013/09/30/google-bufferbox-lockers-san-francisco/>.

PCT/US2014/057787, "International Search Report and Written Opinion", Feb. 11, 2015, 14 pages.

\* cited by examiner

INVENTORY DISTRIBUTION METHOD AND SYSTEM

BACKGROUND

With the growing accessibility and breadth of the Internet and telecommunications networks, many retail transactions may be conducted remotely, such as from a consumer's home, without necessitating the consumer to visit a brick-and-mortar retail location. Consumers may browse retail websites, order items, pay electronically, and receive the items delivered to their doorstep. Further, with the increasing usage of mobile devices, consumers frequently conduct transactions on their mobile devices while away from their homes, and can request delivery of items to locations other than a personal home address, for example, an office or a hotel. While convenient to the consumer, the delivery of numerous individual items to numerous individual consumers at varying addresses can become exponentially costly to both retail businesses and consumers.

BRIEF DESCRIPTION OF THE DRAWINGS

Various embodiments in accordance with the present disclosure will be described with reference to the drawings, in which.

DETAILED DESCRIPTION

Figure 1:
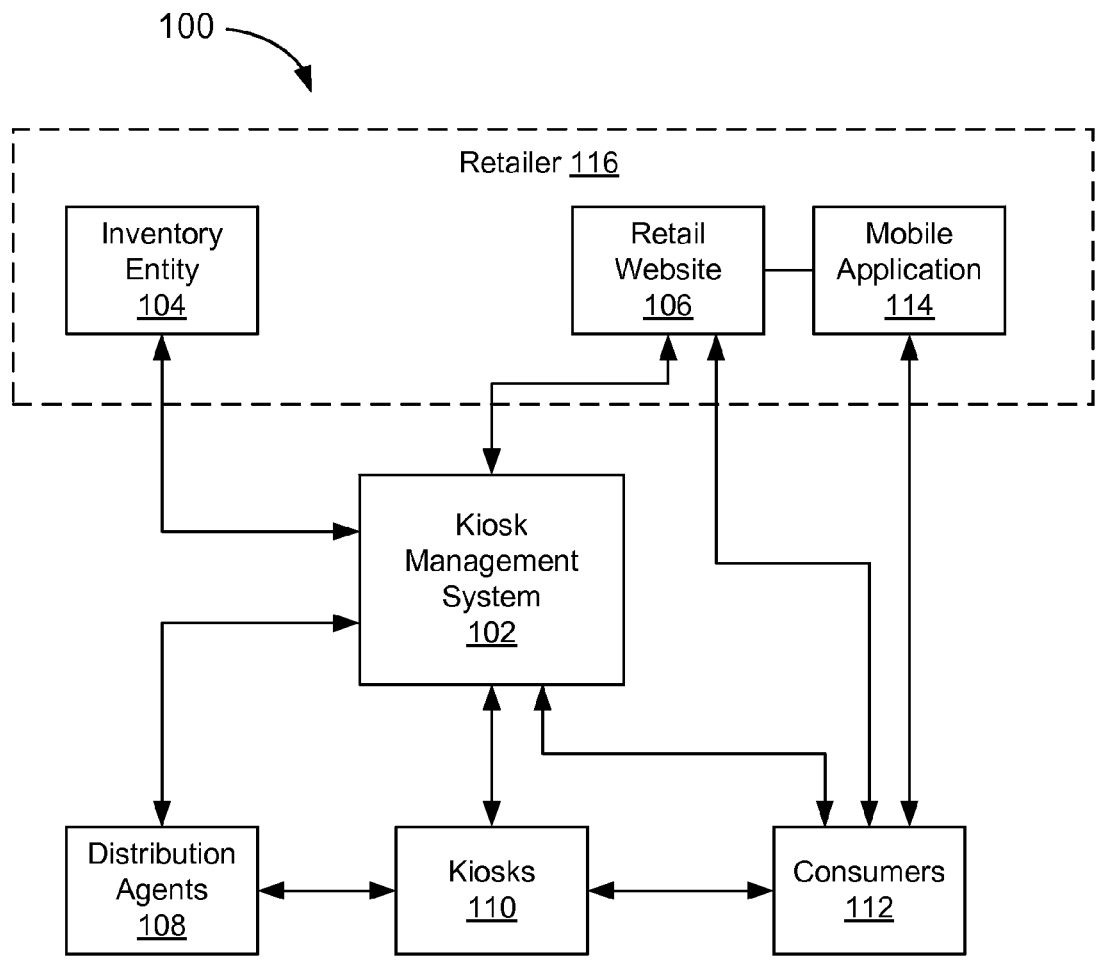
FIG. 1 shows a block diagram illustrating an example distribution system in which items ordered electronically by consumers from a network retailer are delivered to kiosks for retrieval by the consumers.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

An improved distribution system for providing items to consumers can use a network of kiosks to deliver an item to a consumer. The item can be delivered by an operator of a distribution system to a kiosk for the consumer to pick up. For example, a consumer can order one low priced (or otherwise eligible) item or a number of such items, which items may be delivered by an operator of a distribution system to a kiosk for the consumer to pick up. In addition, items regularly-purchased by consumers can be stocked in kiosks and can be purchased on demand according to availability in the kiosk system. The network of kiosks may, for example, include any number of kiosks strategically located for easy and convenient access to consumers. In one embodiment, the number of kiosks includes between 1,000 and 500,000 kiosks. More specifically, the number of kiosks can include 20,000 kiosks. Kiosks may be placed in locations that consumers will already frequent for other tasks, such as gas stations or grocery stores. Because shipping and delivery operations can be shared between the seller and the consumer, the shipping costs charged to the consumer for pick up at a designated kiosk may be significantly reduced (or free, if the shipping costs are negligible to the seller). In one embodiment, the network of kiosks provides an infrastructure that may be scaled to lower prices on millions of items. The shipping of the items to the kiosks of the system may be consolidated to individual distribution agents who work in specific geographies to maintain and/or manage a subset of kiosks. A subset can include one or more kiosks.

In an example embodiment, a consumer may use his or her mobile device (e.g., a smartphone) to see what items are available in nearby kiosks for convenient pick up or retrieval. A kiosk management system may designate kiosks to receive pre-stocked items, for example, items that are often requested by consumers, best-selling items or trending items. The pre-stocked items may vary over different geographic locations. Accordingly, subsets of kiosks in different geographic locations may be stocked with different amounts of pre-stocked items and/or different pre-stocked items. The pre-stocked items and/or the inventory of items in a kiosk or a subset of kiosks can be customized based on previous transaction history and/or other analytical data relating to the demographic and buying patterns of consumers in the geographical locations of the subsets of kiosks.

After the selection of a particular item(s) for purchase during a checkout process, the consumer may choose a designated kiosk to pick up the item(s). The designated kiosk may be at a location to which the consumer plans to go anyway, such as a grocery store, a location that is en route to the consumer's final destination, or another location convenient to the consumer. For example, the consumer may be traveling for business and select a kiosk at an airport at which he/she will have a layover.

When the consumer has requested items and selected a kiosk, the kiosk management system may communicate with the designated kiosk to coordinate delivery. In some cases, the requested item may be an item that is pre-stocked at a subset of kiosks. The kiosk management system may communicate with the designated kiosk to reserve the item for the consumer so that the reserved items may not be retrieved or purchased by other consumers. In other cases, the requested item may not be included in the pre-stocked items that are typically pre-stocked. To reduce the added shipping cost to the consumer, the consumer may elect to pick the requested item up at a designated kiosk after it has been stocked with the requested item. The kiosk management system may coordinate delivery of the requested item to the designated kiosk. In some embodiments, the delivery of items to the network of kiosks may involve distribution agents to stock kiosks with items.

When a requested item is delivered and/or reserved at a designated kiosk, a consumer may receive a notification from the kiosk management system that the requested item is available at the designated kiosk. Retrieving the requested item may involve the consumer going to the designated kiosk to have the requested item released from the kiosk so that the consumer can pick up the requested item and take it home. To release the requested item, the consumer may be prompted by the designated kiosk to log in with his or her pre-registered account information associated with the kiosk management system. The kiosk includes various mechanical components to secure, lock, and store all items. Releasing the requested items may include dispensing the requested item to the consumer, for example, through a door or compartment. In another example, each requested item may be stored and locked in an individual compartment or module, such that releasing the requested item involves unlocking that individual compartment or module for the consumer.

In another embodiment, when the consumer is notified that the requested item is available, the notification may also include a generated code. The notification may be transmitted via the Internet or any other telecommunications network, in the form of an electronic mail, instant message, text message, SMS, social network post, or any other suitable communication or message. The generated code can be a generated by the kiosk management system and may be a randomly generated alphanumeric code of varying length. The generated code may be unique to the transaction, consumer, kiosk, and/or item. In other embodiments, the generated code may be associated with the kiosk, consumer, transaction, and/or item for identification purposes. To initiate retrieval of the requested item from the designated kiosk, the consumer may be prompted to enter the generated code. The kiosk may then communicate with the kiosk management system to verify the generated code, and release the requested item when the code is verified. In other embodiments, the kiosk management system may simultaneously send the generated code to the designated kiosk and within the consumer notification. Thus, the designated kiosk may verify the generated code locally when the consumer enters the code to release the requested item(s). A payment process to authorize payment of the transaction may begin when the consumer initiates retrieval of the requested items from the kiosk. Thus, consumers are not charged for items that they have not retrieved.

Alternatively, the consumer may designate a second consumer, such as a friend or family member, to pick up the particular item(s), and/or the consumer may select items as a gift for a recipient to pick up. In some embodiments, the consumer may designate a designated kiosk for the recipient. The recipient may receive an e-mail, text, or other message from the kiosk management system that a gift is waiting for them at the designated kiosk. The message may further contain a generated code. For the recipient to initiate retrieval of the requested item(s), the recipient may be prompted by the designated kiosk to log in with the generated code that the recipient received in the message. The designated kiosk may communicate with the kiosk management system to verify the generated code and when verified, release the gift to the recipient. Alternatively, the kiosk may receive a communication with the kiosk management system to reserve the requested item with the generated code. Thus, when the recipient logs in with the generated code, the kiosk may verify the generated code locally to release the requested item to the recipient.

It should be recognized that some retailers provide items (e.g., goods and/or services) for consumers may offer shipping and delivery of the items when ordered remotely by consumers via an electronic marketplace or network site. Operators or owners of such electronic marketplaces or sites may also provide distribution services (e.g., inventory management, packaging, shipping, etc.) for individual sellers who would prefer not to provide such distribution services themselves. Without the distribution system, in some cases, low priced items may be too expensive to ship directly to the home of a consumer. An improved distribution system for providing items to consumers, such as described herein, can use a network of kiosks to reduce costs of distribution, including consumer, retailer and seller costs. Herein, retailers and sellers may be referred to interchangeably.

FIG. 1 shows an example block diagram of an example distribution system 100 according to at least one embodiment in which items ordered electronically by consumers 112 from a retailer 116 are delivered to kiosks for retrieval by the consumers. The distribution system 100 can include a kiosk management system 102 and an inventory management system that can be operated by a retail entity providing a plurality of items. In other embodiments, a retailer 116 or other seller may be a separate entity from the entity that operates the kiosk management system 102. The retailer 116 may operate its own retail website 106 and/or provide its own mobile application 114 for purchasing items. The retailer 116 can be in direct communication with an inventory entity 104, such as a warehouse, fulfillment center or distribution center, where the items offered by the retailer 116 via the retail website 106 and/or mobile application 114 are physically stored.

The kiosk management system 102 may also include an inventory management system and can be in communication with the inventory entity 104. The kiosk management system 102 may be associated with a retail website 106 manage delivery of items that are stored by the inventory entity 104 to kiosks 110 of the distribution system 100. The kiosk management system 102 may be operatively coupled, e.g., via a communications network, to a network of kiosks 110, which are placed in strategically designated geographic locations. The network of kiosks 110 may be maintained and stocked with items by a plurality of distribution agents 108. The kiosk management system 102 may communicate with the kiosks 110 via a communications network to determine a current inventory of items in the kiosks 110. In addition, the kiosk management system 102 and/or kiosks 110 may communicate with the distribution agents 108 and the inventory entity 104 to initiate a consolidated shipment of items to particular distribution agents 108. The distribution agents 108 may then deliver the items to individual kiosks 110 to which the distribution agents 108 are assigned to manage and maintain.

Distribution agents 108 may be assigned to a subset of kiosks 110 based on geographical location, such that the inventory entity 104 may consolidate shipping of pre-stocked items to the distribution agents 108. The distribution agents 108 may then make deliveries of various items to specific kiosks 110. The inventory and available items provided to each kiosk may not be identical between kiosks. However, because the assignment of distribution agents 108 to kiosks 110 can be based on geographical location, the delivery of items to different kiosks 110 may be efficient and cost-effective for the kiosk management system 102.

A distribution agent 108 may be an automated machine or robot operated by the kiosk management system 102, an individual person authorized by the kiosk management system 102 or an authorized entity (e.g., merchant, business, etc.). The distribution agent 108 can be responsible for maintaining and delivering to one or more kiosks 110. The kiosk management system 102 may instruct delivery of consolidated shipments of items to the distribution agent 108 from an inventory entity 104 on a regular basis, for example, daily. Upon receipt, the distribution agent 108 may go to each kiosk 110 to which the distribution agent 108 is assigned and deliver the items to kiosk 110 accordingly, including placing the items in item storage within the kiosk 110 (see e.g. Product Storage 608 in FIG. 6). Once an item is delivered to a designated kiosk 110, the kiosk management system 102 may send a notification (e.g., email, text message, etc.) to the consumer 112 to inform the consumer 112 that the requested item is ready for pick up. In some embodiments, the consumer 112 is not charged for the requested item until the requested item is retrieved by the consumer 112 at the designated kiosk 110. When the consumer 112 is at the designated kiosk 110, he or she may browse the kiosk 110 for pre-stocked items that are available (i.e., in stock and not reserved for another consumer 112) and purchase additional pre-stocked items together with the requested item. A payment process may be initiated to authorize payment of the requested item and additional pre-stocked items purchased in a transaction at the designated kiosk 110. The payment process may be initiated by the designated kiosk 110 to the kiosk management system 102, retailer 116, or other entity.

The kiosk 110 may update its inventory in real time to enable the kiosk management system 102 to have a current status of each of the plurality of kiosks 110. By analyzing data received from the kiosks 110, the kiosk management system 102 may can determine which pre-stocked items to place in the kiosks and track inventory turns. A distribution agent 108 can remove unclaimed items from the kiosk 110 not picked up within a designated timeframe. The removal of unclaimed items can enable kiosk management system 102 place items in the kiosk 110 as dictated by the kiosk management system 102. The kiosk management system 102 can also credit a consumer account for removed unclaimed items.

Distribution agents 108 may operate 365 days a year and can manage anywhere from 1 to a million kiosks 110 or more, depending upon the kiosks' sizes and capacities. For example, in very small towns, only one kiosk 110 may be sufficient to service the town, but in larger cities hundreds of kiosks 110 may be needed.

Consumers 112 may browse items and make requests for items via the retail website 106 using a desktop, laptop, mobile device, etc. or via a mobile application 114 using a mobile device, such as a smartphone, tablet, electronic book reader or other mobile device capable of connecting to the Internet. The consumers 112 may access the retail website 106 through a communications network, such as the Internet. The communication network may be any wired network, wireless network, or combination thereof. In addition, the network may be a personal area network, local area network, wide area network, cable network, satellite network, cellular telephone network, or combination thereof. For example, the communication network may be a publicly accessible network of linked networks, possibly operated by various distinct parties, such as the Internet. In some embodiments, the communication network may be a private or semi-private network, such as a corporate or university intranet. The communication network may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein. The computing device of the consumer may connect to any such communications network via a wireless (e.g., Wi-Fi) or wired network connection. When a consumer 112 is using the mobile application 114 on a mobile device, the mobile device may be connected through a telecommunication network provided by a service provider, or a wireless (e.g., Wi-Fi) network.

In some embodiments, the retailer 116 may include the kiosk management system 102. The consumer 112 may be in communication directly with the kiosk management system 102 when the kiosk management system 102 is also the retailer offering the items. In such cases, the consumer 112 may pre-register account information and payment information with the kiosk management system 102. Account information can include a username, password, login information, delivery address, mobile device number or other identification number (e.g., IP address). Payment information can include a credit card identifier, bank account identifier, rewards account identifier, billing address, or any other suitable information needed by an issuer and a consumer 112 to authorize a payment transaction and perform clearing and settlement of funds such that the consumer 112 can pay for the requested items.

The network of kiosks 110 may be strategically located at, or in proximity to, other businesses with which the kiosk management system 102 may have a partnership. Thus, when a consumer 112 goes to a kiosk 110 that may be located at a gas station, a promotion may be offered to the consumer, such as $0.03 off per gallon during the consumer's visit when the consumer 112 retrieves the requested item at the kiosk. In another example, a kiosk may be located at a coffee shop, so a consumer 112 may be incentivized to select that kiosk if he/she wants to receive a promotion for coffee or other items sold at that coffee shop, and/or if the consumer 112 was planning on going to the coffee shop to get coffee and can pick up his or her requested item on the same trip.

Figure 2:
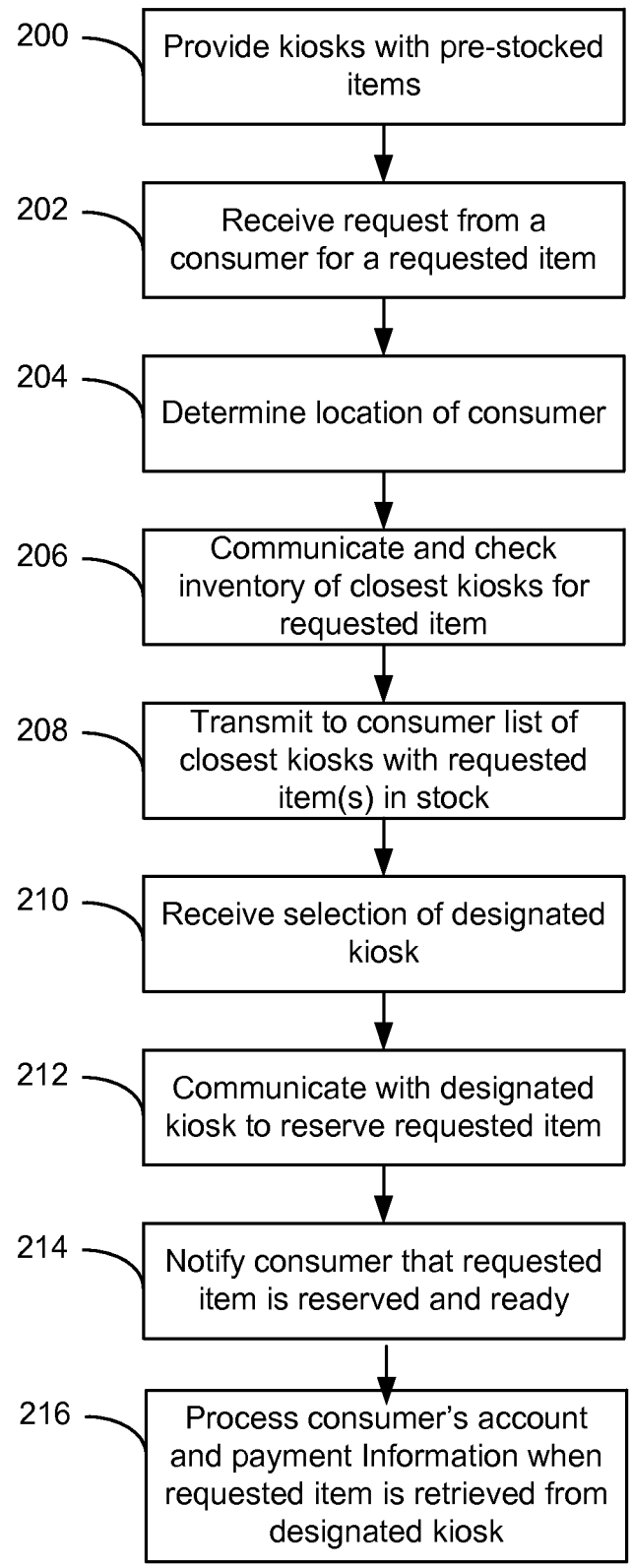
FIG. 2 shows a flow diagram illustrating an example kiosk management method implemented in the distribution system of FIG. 1.

Techniques described and suggested herein include methods and systems for distributing items to a multitude of consumers using a network of kiosks 110 managed by a kiosk management system 102. FIG. 2 shows a flow diagram illustrating an example kiosk management method 200 implemented in the distribution system of FIG. 1. Some or all of the process shown in FIG. 2 (or any other processes described herein, or variations and/or combinations thereof) may be performed under control of one or more computer systems configured with executable instructions and may be implemented as code (e.g., executable instructions, one or more computer programs or one or more applications) executing collectively on one or more processor devices, by hardware or combinations thereof. The code may be stored on a computer-readable storage medium, for example, in the form of a computer program including a plurality of instructions executable by one or more processor devices. The computer-readable storage medium may be non-transitory.

In one embodiment, the kiosk management system 102 of FIG. 1 may cause a network of kiosks 110 to be provided with pre-stocked items at 200. The selection of pre-stocked items provided at specific kiosks may be determined by the kiosk management system 102 based on transaction history of the specific kiosks, or in other embodiments, by an external retailer in communication with the kiosk management system 102 to provide the items to the specific kiosks. Thus, individual kiosks in different locations may have quantities of items, as well as items that vary from other kiosks.

At 202, the kiosk management system 102 may receive a request directly or indirectly from a consumer for one or more items. For example, the consumer may generate a request through a retail website 106 or mobile application 114 operated by an external retailer 116. The external retailer can then provide the request to the kiosk management system 102. In some embodiments, the consumer may browse available pre-stocked items and from the pre-stocked items in stock, request one or more items. The kiosk management system 102 can determine which items are pre-stocked at which kiosks 110. The pre-stocked items in local kiosks 110 can be requested and/or reserved by consumers 112 through use of a retail website 106 and/or mobile application 114 operated by the retailer 116. Alternatively, a consumer 112 may go directly to a kiosk and browse the pre-stocked items available for purchase at that kiosk, such as pre-stocked items that are not reserved for other consumers.

In one embodiment, the consumer may request items that are not included in the pre-stocked items be made available as pre-stocked items. The consumer can make this request from the website operated by the kiosk management system 102, retail website 106 or mobile application 114 operated by the external retailer 116. The requested items that are not pre-stocked may be distributed to a designated kiosk chosen by the consumer. Thus, the requested item may be included in the selection of pre-determined pre-stocked items. Alternatively, the consumer may request one or more items that are excluded from the stock of items available in the kiosks.

In one embodiment, the kiosk management system 102 can use a location of the consumer at 204 to aid in distribution of an item to the consumer. The location of the consumer may be determined by an IP address of the consumer's computer, or a GPS location from the consumer's mobile device. The location of the consumer may also be determined based on other account information, such as a work/office address. The consumer may also provide her current location or address in the request. In an alternative embodiment, the consumer may provide a designated location, such as a future destination, to which she will be traveling so the requested item(s) can be picked up upon her arrival at the destination. For example, if the consumer knows she will be in New York for a business trip tomorrow, she can designate the requested item for pickup at a kiosk 110 located in New York that is convenient for her. In another example, the consumer may designate a location that is en route to his or her commute to or from work.

At 206, the kiosk management system 102 may determine a subset of kiosks 110 within a designated area near the location of the consumer. Then, the kiosk management system 102 may communicate with the subset of kiosks 110 to determine whether at least one of the kiosks 110 within the designated area has the requested item(s) in stock. The designated area may be set by the consumer, or have a default value determined by the kiosk management system 102. For example, the kiosk management 102 system may search for kiosks within 5 miles of the location of the consumer, and determine which one, if any, of the kiosks within 5 miles of the location of the consumer have the requested item(s) currently in stock for the consumer.

When it is determined that there is at least one kiosk 110 in the subset of kiosks having the requested item(s) in stock and is within the predetermined proximity of the location of the consumer, the kiosk management system 102 may transmit a list identifying such kiosks to provide to the consumer, such as through the retail website 106, as shown at 208. The kiosk management system 102 may also identify kiosks 110 that are outside of the predetermined proximity of the location to offer more kiosk selection options to be provided to the consumer, particularly if not many kiosks are found to have the requested item(s) in stock.

The consumer may then select a kiosk 110 and have the selection provided to the kiosk management system 102. Thus, at 210, the kiosk management system 102 may receive a communication from the consumer with the selection for the kiosk 110 at which the consumer would like to initiate retrieval of the requested items. Alternatively in another embodiment, the kiosk management system 102 may communicate with the consumer through the retail website 106 or mobile application 114 operated by the external retailer 116. Thus the kiosk management system 102 may receive the communication with the selection for the kiosk 110 made by the consumer and transmitted from the retail website 106 or mobile application 114.

Once the kiosk management system 102 receives the selection, the kiosk management system may communicate with the designated kiosk 110 with a reservation communication to reserve the requested item at 212. The designated kiosk 110 may reserve the requested item for a limited amount of time, for example, 3 days. When the requested item is reserved, it is reserved for the requesting consumer or a recipient designated by the requesting consumer such that another consumer cannot retrieve the requested reserved item. For example, another consumer browsing for pre-stocked items in local kiosks or another consumer at the designated kiosk cannot select the reserved item for purchase. In one embodiment, the consumer may provide an estimated time when the requested item will be picked up, and when that time has elapsed, the reservation for the requested item may be cancelled or may otherwise expire. In some embodiments, only when the requested item is successfully retrieved by the consumer is a payment process initiated and the consumer is charged. In one embodiment, the reservation communication from the kiosk management system 102 to the designated kiosk 110 may include a code generated by the kiosk management system 102. The generated code may also be sent to the consumer in a notification message alerting the consumer that the requested item is available at the designated kiosk 110 for retrieval, as shown at 214. The notification may be transmitted via a communications network such as those described above, in the form of an electronic mail, instant message, text message, SMS, or any other suitable communication or message.

The generated code may be unique to the transaction, consumer, kiosk, and/or item. In one embodiment, the generated code is a randomly generated alphanumeric code of varying length. In other embodiments, the generated code is an optical code, such as a one-dimensional bar code, or a two-dimensional bar code such as a Quick Response Code (QR code). In other embodiments, the generated code may be associated with the kiosk, consumer, transaction, and/or item for identification purposes.

To initiate retrieval of the requested item from the designated kiosk 110, the consumer may be prompted to enter the generated code at the kiosk 110. The kiosk 110 may then communicate with the kiosk management system 102, as shown at 216, to verify the generated code, and release the requested item when the code is verified to begin payment processing for the item using the consumer's account information and payment information. In some embodiments where the kiosk management system 102 sends a communication to the designated kiosk 110 with the generated code, the designated kiosk may verify the generated code locally when the consumer enters the code to the kiosk to release the requested item(s).

At 216, the transaction is complete when the kiosk management system 102 processes payment using the consumer's account information and payment information and instructs the designated kiosk 110 to release the requested item. In one embodiment, the consumer pre-registers his or her account information and payment information with the kiosk management system 102. In another embodiment, the consumer may pre-register account information and/or payment information with the retail website or retailer; accordingly, the kiosk management system may communicate with the retail website to initiate payment. Account information can include a username, password, login information, delivery address, mobile device number or other identification number (e.g., IP address). Payment information can include a credit card identifier, bank account identifier, rewards account identifier, billing address, or any other suitable information needed by an issuer and a consumer to authorize a payment transaction and perform clearing and settlement of funds such that the consumer can pay for the requested items.

Any or all of the operations and functions described above in the example method of FIG. 2, in any order, may be performed by an example kiosk management system 102. The kiosk management system 102 may include a server computer 300 or a group of servers processor devices configured to execute computer readable instructions stored in non-transitory computer readable media.

Figure 3:
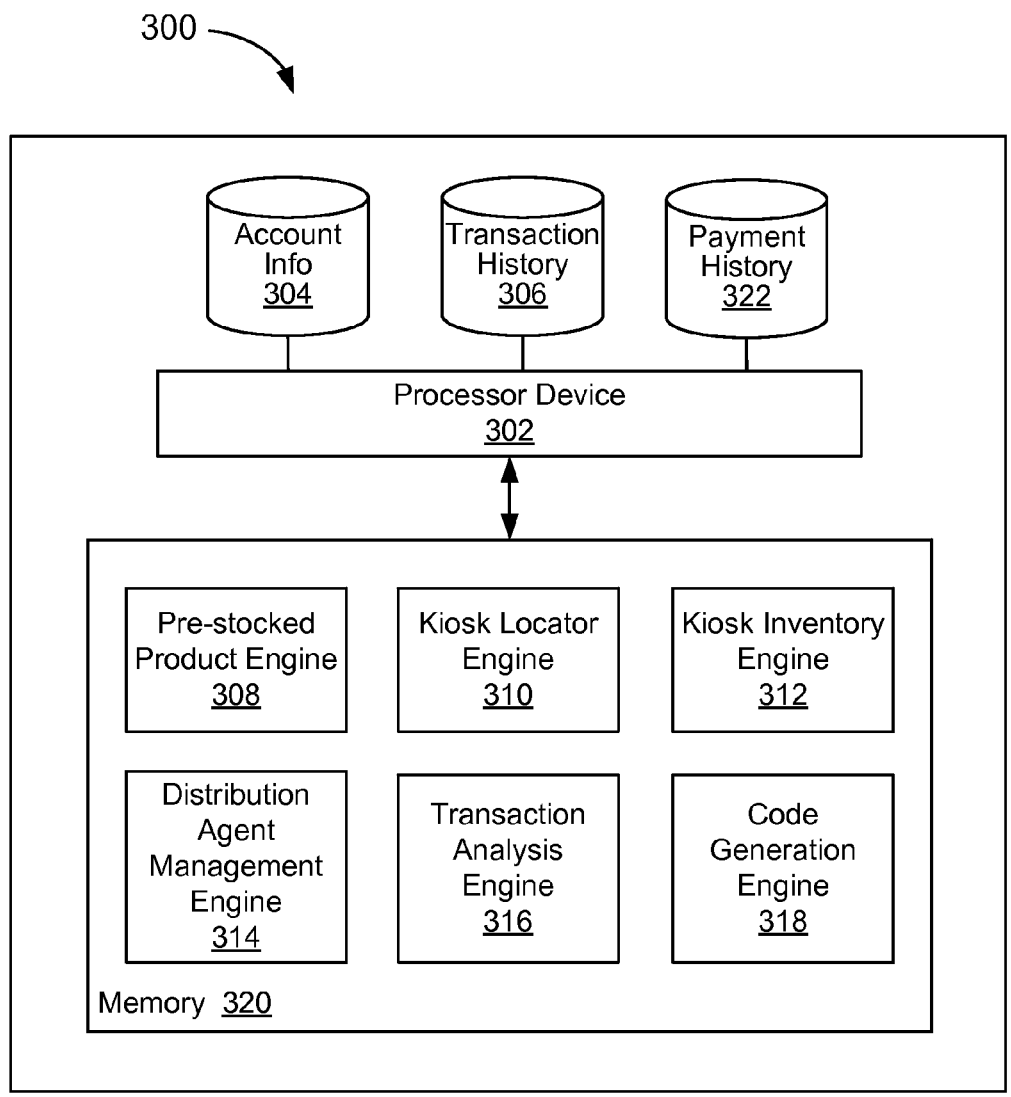
FIG. 3 shows a block diagram illustrating an example kiosk management system of the distribution system of FIG. 1.

FIG. 3 shows a block diagram illustrating an example kiosk management system of the distribution system of FIG. 1. As illustrated in FIG. 3, the example kiosk management server 300 may include a processor device 302 and a memory 320. The processor device 302 can be communicatively coupled to and have access to several remote and/or local data stores configured to store data, for example, an account information data store 304, transaction history data store 306, and/or a payment information data store 322. The account information data store 304 may store account information associated with a plurality of consumers. In some embodiments, the account information is pre-registered for each consumer. In other embodiments, temporary account information may be generated and temporarily stored for consumers making a one-time transaction as a "guest consumer," as opposed to a "registered consumer." Thus, the temporary account information may be unique to the one-time transaction. Account information can include a username, password, login information, delivery address, mobile device number or other identification number (e.g., IP address). Additionally, account information of the consumer can include gender, age, annual income, annual average spending, preferred items, or other relevant demographic or analytical data.

The transaction history data store 306 may store information relating to previously conducted transactions, including for example, items in the transactions, the quantity of items, the payment type used for the transactions, where and when the transactions were conducted, the kiosks used for the transactions, etc. For example, the transaction history may show that in San Francisco on rainy days, more umbrellas are requested from the kiosks 110 in popular areas of San Francisco. The transaction history may also be correlated with some of the account information. For example, the transaction history may show an increased number of earphones requested by consumers aged 18-25 and retrieved from kiosks 100 located near universities. The transaction history stored in transaction history data store 306 may be for a plurality of transactions involving different items, consumers, locations and kiosks 110.

The payment history data store 322 may store payment information associated with a plurality of consumers. Payment information can include a credit card identifier, bank account identifier, rewards account identifier, billing address, or any other suitable information needed by an issuer and a consumer to authorize a payment transaction and perform clearing and settlement of funds such that the consumer can pay for the requested items. Additionally, payment information of the consumer can include a gift certificate identifier, coupon code, or other information relevant to payment processing of the transaction.

The memory 320 may include several software modules of code executable by the processor device 302 to perform functions of the kiosk management server 300. In an example, the memory 320 may include a selected item engine 308 to determine an initial subset of items with which to pre-stock one or more kiosks 110. The initial subset of items selected for pre-stock in one or more kiosks 110 may be determined from a plurality of total items offered by a retail website 106 and/or kiosk management system 102. In some embodiments, the pre-stocked items may be determined by a transaction analysis engine 316 that analyzes data stored in the account information data store 304 and/or transaction history data store 306. There may also be a kiosk locator engine 310, which may determine and locate a subset of kiosks within a predetermined proximity of a location of the consumer or a location designated by the consumer. Additionally, a kiosk inventory engine 312 may monitor and report inventory of items offered in kiosks 110 placed in various locations. The memory 320 may further include a distribution agent management module 314, to manage the plurality of distribution agents and to which kiosks each distribution agent is responsible for monitoring, maintaining, and delivering items. Further, a code generation engine 318 may generate the code provided to the consumer and/or designated kiosk 110 for retrieval of the requested item.

Those skilled in the art will appreciate that the kiosk management system 102 can be any computing system that is configured to communicate via a communications network. For example, the kiosk management system 102 may include any number of kiosk management servers 300, and/or other server computing devices, desktop computing devices, mainframe computers, and the like. In some embodiments, the kiosk management system 102 can include several devices physically or logically grouped together. The kiosk management system 102 can include various modules and components combined on a single device, multiple instances of a single module or component, etc. In some embodiments, the features and services provided by the kiosk management system 102 may be implemented as web services consumable via a communications network. In further embodiments, the kiosk management system 102 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 4:
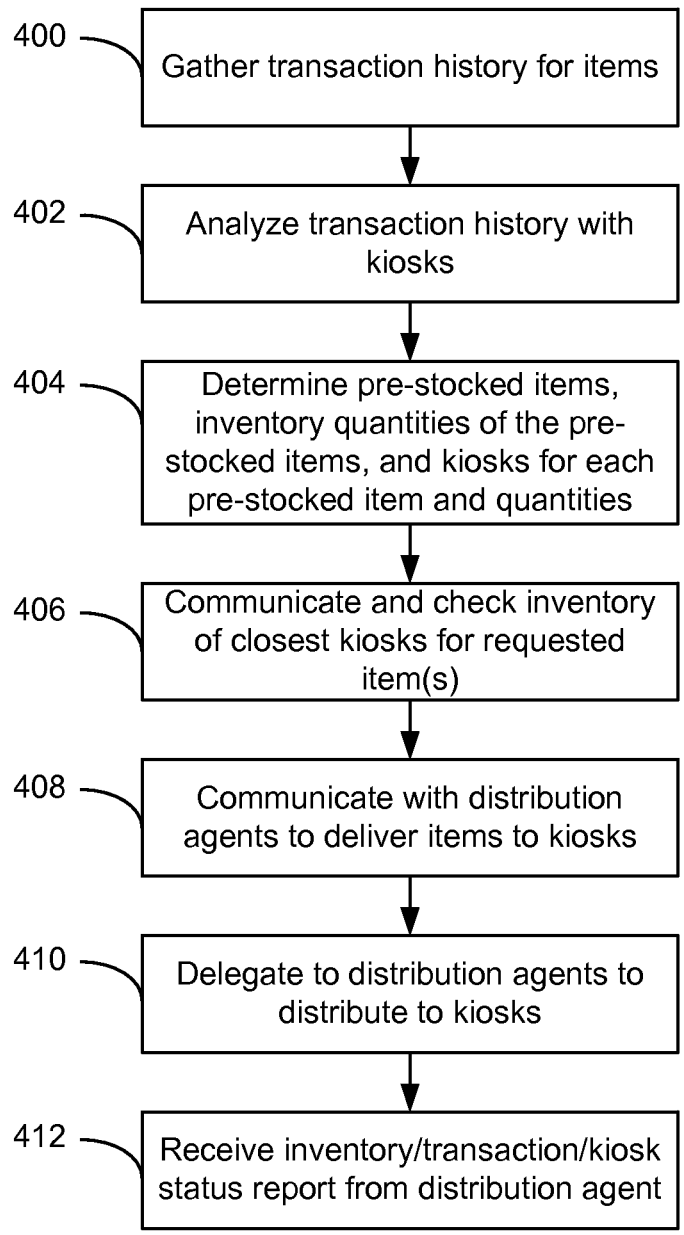
FIG. 4 shows a flow diagram illustrating an example method implemented by the kiosk management system of FIG. 3 to determine initial items with which to pre-stock kiosks.

As shown in FIG. 3 and noted above, the kiosk management server 300 may, in memory 302, include a select item engine 318 to determine which kiosks will be pre-stocked, the initial items with those kiosks will be pre-stocked, and the quantity of the initial items. FIG. 4 shows a flow diagram illustrating an example method implemented by the kiosk management system of FIG. 1 to determine initial items with which to pre-stock kiosks. As illustrated, select item engine 318 may gather transaction history for a plurality of items at 400. The transaction history can include information relating to previously conducted transactions, including, for example, items in the transactions, the quantity of items, the payment type used for the transactions, where and when the transactions were conducted, the kiosks 110 involved in the transactions, etc. For example, the select item engine 318 may initially gather transaction history data and determine that on a particular day, many more umbrellas were requested and sold from kiosks 110 in a particular geographic area.

At 402, the select item engine 318 may analyze the transaction history and correlate the transaction history with specific kiosks 110. Thus, the select item engine 318 may determine which kiosks 110 were offering umbrellas and determine which kiosks 110 located in San Francisco were particularly preferred in consumers' requests for umbrellas.

Further, it may be determined that kiosks 110 in San Francisco were preferred for consumers to pick up requested umbrellas because many consumers commute to San Francisco to work. Thus, when a consumer forgets to bring his or her umbrella, or it begins to rain on his or her way to work, the consumer can use his or her mobile device to order an umbrella and have it reserved for pick up at a kiosk located at a public transportation station in San Francisco. Accordingly, at 404, the select item engine 318 may select which items, quantities of items, and the kiosks 110 in which to offer the items based on the transaction history and data analysis. Based on further analysis, for example, the item select engine 318 may select scarves and gloves to offer at San Francisco kiosks 110 for consumer commuters who find themselves unprepared for the day's weather. The select item engine 318 may also determine and learn which kiosk locations are preferred and most often frequented by consumers, for example, kiosks located at public transportation stations, coffee shops, or common lunch destinations.

At 406, the kiosk management system 102 may communicate with the plurality of kiosks 110 to determine a current stock of currently offered items, for example, to determine if a kiosk 110 is running low on a commonly requested item, if a particular item has sold out, or if a particular item has not been sold for some time. In another embodiment, the kiosk management system may monitor inventory of the kiosks 110 and their items remotely without communicating with them. Different kiosks at different locations may offer a different selection of items and in different quantities. For example, kiosks located in airports may offer a wider selection of travel-sized hygienic products or electronic accessories, such as laptop and phone chargers, which may be items commonly forgotten by consumers when they are traveling. In comparison, kiosks located by universities may offer university-affiliated paraphernalia or office supplies, such as pens and notebooks, in addition to laptop and phone chargers.

Next, at 408, when the select item engine 318 has determined which kiosks to stock with which pre-stocked items and whether certain kiosks are running low or have sold out of certain pre-stocked items, the kiosk management system 102 may communicate with a plurality of distribution agents 108. In some embodiments, distribution agents can be people, automated robots, or businesses authorized by the kiosk management system 102, to which the kiosk management system 102 can provide instructions to and initiate consolidated delivery of item shipments. For example, the kiosk management system 102 instructs a delivery agent to deliver of 100 earphones to a coffee shop at which a kiosk 100 that sells many earphones is located. The kiosk management system 102 also notifies an inventory entity, such as a warehouse, to include the 100 earphones in the next shipment to the delivery agent. In yet other embodiments, distribution agents 108 can be automated machines or robots capable of delivering items to kiosks 110.

At 410, the distribution agents 108 then can deliver the items they have received to the individual kiosks 110 to which they have been assigned by the kiosk management system 102. For example, in a remote town, a distribution agent 108 may be an authorized person who is responsible for maintaining 5 kiosks 110 in the remote town. Thus, instead of the kiosk management system 102 instructing direct delivery of specific items to each of the 5 individual kiosks 110, the items allocated for the 5 kiosks 110 in the town are consolidated and delivered to the authorized person (i.e., the distribution agent 108). The distribution agent 108 then makes individual deliveries of specific items to each the individual 5 kiosks 110. Distribution agents may additionally transfer items between kiosks for inventory reasons, for example if one kiosk sells out of a pre-stocked item often requested by consumers, the distribution agent may transfer a number of the pre-stocked items from another kiosk having a higher inventory of the pre-stocked item.

Individual persons acting as distribution agents may be compensated, for example, salaried, hourly, on a per shipment basis or as a percentage of the transaction cost. Compensation to the distribution agents may also include discounts on items that may be dispensed by the kiosks the distribution agent is assigned to manage. The kiosks may be configured to dispense funds, vouchers, credits to the distribution agent as compensation.

At 412, the kiosk management system 102 may receive reports from the kiosks 110 and/or the distribution agents 108 regarding the kiosk inventory, transactions, or status. For example, the distribution agent may notice a malfunction in one of the kiosks 110, or may notice that a particular kiosk may be difficult to find. This information may be reported back to the kiosk management system 102 for evaluation and processing. Other information reported back may include notification of repairs and/or other suitable feedback that may be transmitted to the kiosk management system 102 automatically and/or directly by the kiosk 110, or by the distribution agent 108. The distribution agent can create the report though use of an administrative interface of the kiosk, if functioning, or through use of other network connected devices, such as an application on a smartphone.

Figure 5:
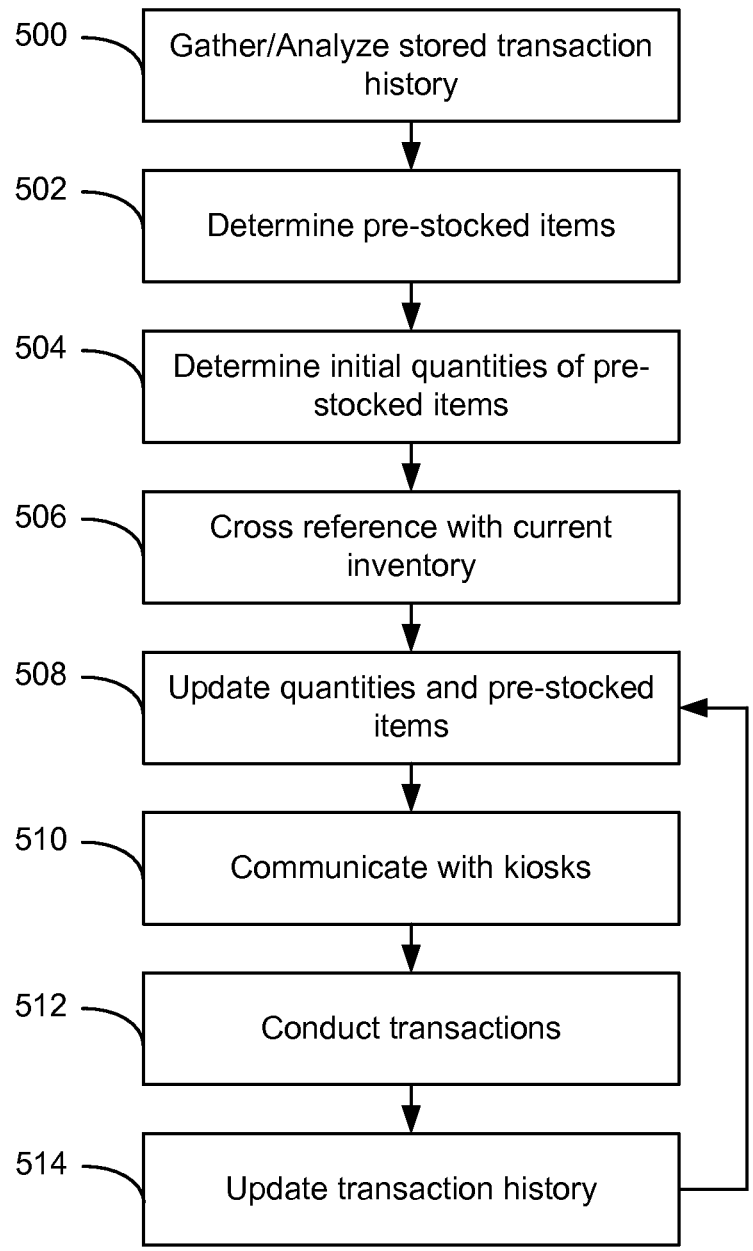
FIG. 5 shows a flow diagram illustrating an example method implemented by the kiosk management system of FIG. 3 to manage inventory among kiosks.

To determine an initial selection and quantity of items with which to pre-stock some of the kiosks 110, a kiosk management system 102 may implement an example method of iterative inventory management as illustrated in FIG. 5. FIG. 5 shows a flow diagram illustrating an example method implemented by the kiosk management system of FIG. 1 to manage inventory among kiosks. In the example method, at 500, the kiosk management system 102 may initially gather and analyze stored transaction history information associated with a plurality of items and a plurality of consumers.

Based on the transaction history of items purchased by the plurality of consumers, a subset of the plurality of items may be selected at 502. For example, the subset of items may include best-selling items, highest rated items, and/or most frequently sold items. In some embodiments, the pre-stocked items may also be correlated with a geographical location of specific kiosks 110, demographic information related to specific kiosks or their location, or other environmental information related to specific kiosks or their location. For example, it may be observed by the kiosk management system 102 and recorded in the transaction history that the number of umbrellas requested during rainy days is significantly increased over dry days, or sunscreen is requested in higher quantities in Miami, Fla. compared to Seattle, Wash. The kiosk management system can also use data from the retailer, such as geographic sales data, in the determination of pre-stocked items.

At 504, once items have been selected for pre-stocking, the kiosk management system 102 may determine initial quantities of the pre-stocked items to have stocked in some of the kiosks 110. Different kiosks can offer different items and in different quantities. For example, all kiosks 110 in the Los Angeles area may be pre-stocked with sunscreen; however, the kiosks 110 located in Long Beach and other beach areas may have higher quantities of sunscreen stocked than kiosks 110 in downtown Los Angeles.

To determine a quantity of items to stock within a subset of kiosks 110, the kiosk management system 102 may determine the current inventory of items already stored in the subset of kiosks 110, as shown at 506. Thus, if some kiosks have a number of a particular item over a specific threshold, the kiosk management system 102 may not coordinate to have more of the particular item delivered to those kiosks. However, if it is determined that some kiosks have sold out of or are below a certain threshold of a particular item, then the kiosk management system 102 may initiate delivery of an additional quantity of the particular item to a distribution agent for stocking within those kiosks.

Subsequently, at 508, the kiosk management system 102 may update what the pre-stocked items are and the quantities of the pre-stocked items based on at least transaction history and other data from individual kiosks, such as current inventory of the pre-stocked items. The selection of pre-stocked items may be updated, or the quantities of the pre-stocked items may be altered depending on sales and transfer of pre-stocked items between kiosks. In some cases, it may be determined that the quantity of certain items in particular kiosks has not sold as quickly as anticipated, and thus, the inventory of these certain items in particular kiosks is higher than expected. Accordingly, at 510, the kiosk management system 102 may communicate with these particular kiosks and/or with the distribution agents 108 assigned to these particular kiosks to coordinate future delivery of certain items to these particular kiosks, to return certain items from these particular kiosks to management system 102 or inventory entity 104, or to transfer certain items from these particular kiosks to other kiosks.

Next, at 512, the kiosk management system 102 may conduct transactions with consumers for items consumers may requesting from the retailer 116 or kiosk 110, e.g., the retail website 106. For example, a consumer may request an item that is pre-stocked in at least one of the kiosks 110, or the consumer may request an item that was excluded from the items with which the kiosks 110 were pre-stocked. In the latter case, the item may need to be delivered to at least one of the kiosks by a distribution agent 110. After the completion of a transaction, the transaction history is updated at 514, and an iterative feedback loop is created back to step 508 to update the selection and quantity of pre-stocked items offered at specific kiosks.

Figure 6:
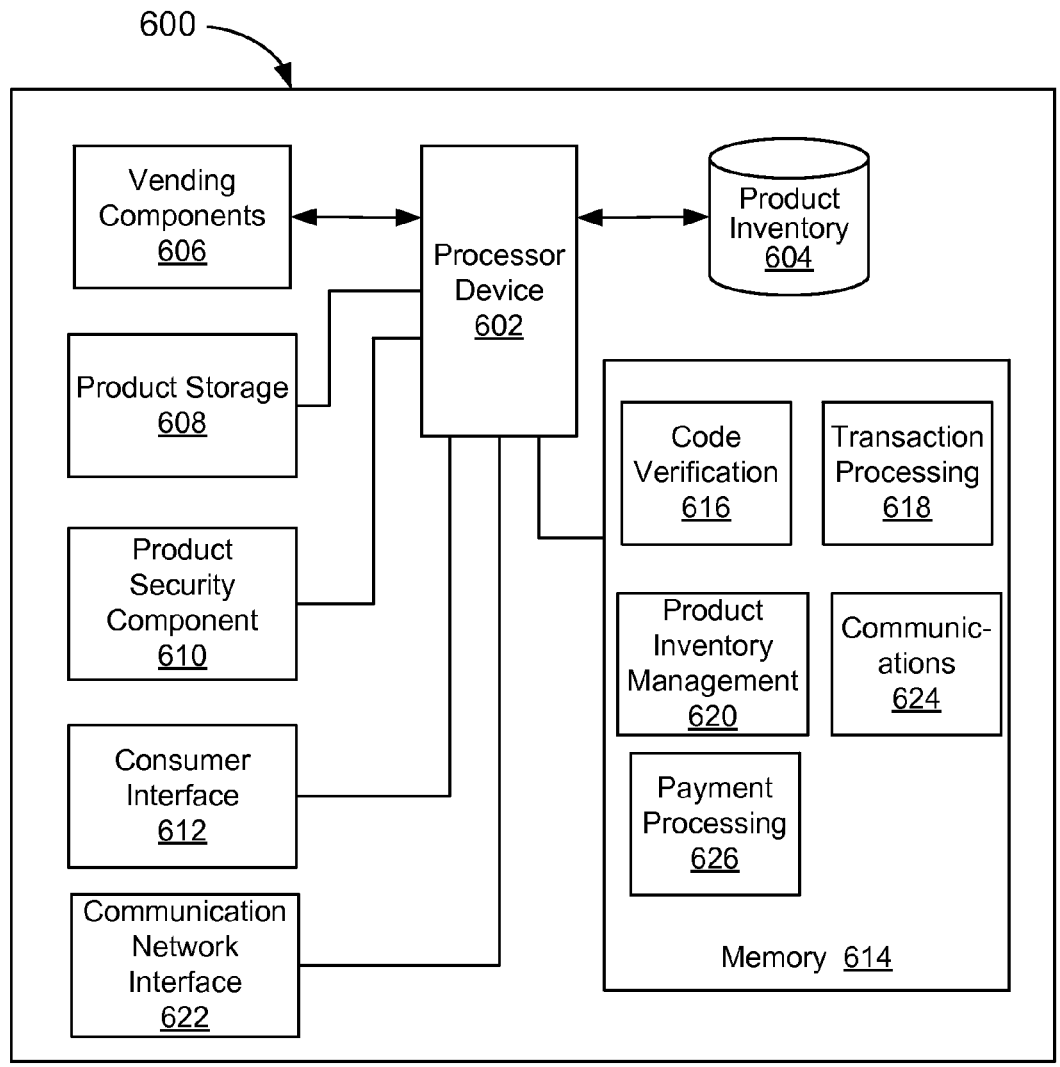
FIG. 6 shows a block diagram illustrating an example kiosk of the distribution system of FIG. 1.

FIG. 6 shows a block diagram illustrating an example kiosk 600 of the distribution system of FIG. 1. The example kiosk 600 may include a processor device 602 and a memory 614. The processor device 602 can be communicatively coupled and have access to at least one data store storing data, for example, an item inventory information data store 604. The item inventory information data store 604 may store item data associated with a plurality of items stored in the kiosk 600, for example, identifiers for items, the quantity of items, and related substitute items.

The processor device 602 may be communicatively coupled to mechanical components, such as vending components 606, to hold, retrieve, and release items stored in an item storage area 608 of the kiosk 600. The kiosk 600 may also include a display or other external input/output interface 612, such as a touch screen or LCD display with a keyboard for a consumer to view prompts and/or enter input, such as a generated code, login information, and/or account information. Further, there may be a security component 610 of the kiosk 600 to protect the items stored in the item storage 608, such as an alarm and/or lock to prevent tampering with the kiosk 600 and/or theft of the items. The security component 610 may also include a security camera and provide live streaming images or video to the kiosk management system 102 to ensure security of the items stored in the kiosk 600. The processor device 602 may further be communicatively coupled to communication interface 622 for communicating with the kiosk management system 101 and other kiosks 110 via a communications network, as described above.

The memory 614 may include several software modules of code executable by the processor device 602 to perform functions of the kiosk management system 102. In an example, the memory 614 may include a code verification module 616. The code verification module 616 may be configured to determine that a generated code from the kiosk management system 102 verifies a received code entered by the consumer through the interface 612 before retrieving and releasing the item. The code verification module 616 may compare the entered code from the consumer with the generated code from the kiosk management system 102 for verification. The memory 614 may also include a transaction processing module 618 configured to initiate payment processing of a transaction with the kiosk management system 102 or retailer 116 when the code entered by the consumer is verified and retrieval of the requested item from the kiosk 600 is initiated. An item inventory management module 620 may be configured to communicate with the item inventory data store 604 to monitor and report the status of various items stored in the kiosk 600 and their current quantities. The item inventory management module 620 may generate warnings when the quantity of a specific item is below a certain threshold, and communicate the warnings to the kiosk management system 102. To receive and transmit communications with the kiosk management system 102 via a communications network, a communication module 624 may also be present in the memory 614 of kiosk 600.

In some embodiments, the kiosk 600 may be capable of storing up to 1,000 items of varying size and weight, and of varying prices, in the item storage area 608 of the kiosk. The kiosk 600 may communicate with the kiosk management system 102 and/or consumers via a communications network using the communication network interface 622. In some embodiments, the kiosk 600 may establish a wireless connection, e.g., via Wi Fi or Bluetooth, to a mobile device utilized by the consumer.

The item inventory management module 620 may communicate real time data regarding the status and item inventory of the kiosk 600 to the kiosk management system 102. In other embodiments, the consumer may interact with the consumer interface 612 to enter a generated code, to enter login information and/or to initiate payment processing. The consumer interface 612 may also provide ordering and account access. Further, in some embodiments, the consumer interface 612 may include a payment interface (not shown) configured to accept cash and credit cards. Cash or credit card information received by the payment interface may be processed by a payment processing module 626 stored in memory 614. In cash payment transactions, the payment processing module 616 may determine change which may be dispensed back to the consumer via the payment interface. In credit card or alternate electronic payments, the payment processing module 626 may, in conjunction with the communication network interface 622, communicate with other entities to process payment, such as the kiosk management system, retailer, or other entity.

In the item storage area 608 of the kiosk 600, a portion of the item storage may contain pre-stocked items determined by the kiosk management system as high turn around items. Another portion of the item storage 608 may be kept empty for requested items that are excluded from the items with which the kiosk 600 is pre-stocked, so that a portion of the item storage 608 remains available for deliveries of requested items to the designated kiosk. The ratio of area for pre-stocked items and area for additional items can be adjusted based on activity and transaction history of the kiosk 600.

Further, additional benefits to the consumer include leveraged partnerships between the kiosk management system 102 and other preferred item providers (e.g., businesses, stores, gas stations, etc.) at which kiosks may be located and maintained. For example, promotions, such as coupons and discounts, may be provided for preferred item providers at which kiosks are located to incentivize consumers to select kiosks at the preferred item providers. Additionally, preferred item providers are incentivized to host and maintain kiosks for the kiosk management system 110 as it may increase consumer flow to the preferred item provider and potential transactions with the offered promotions.

In one example, a distribution agent 108 may be assigned to 100 kiosks 110 within a designated geographic area. The distribution agent 108 may be responsible for the delivery of items, such as daily vitamin packets, to the 100 kiosks 110. It would be very costly for operator of the kiosk management system 102, or a vitamin provider to provide individual vitamin packets to 100 kiosks 110 within a local area, or to deliver hundreds of vitamin packets to a plurality of individual consumers who may or may not be within the same local area. Thus, the kiosk management system 108 or vitamin provider may instruct delivery of a consolidated shipment of hundreds of vitamin packets to the distribution agent 108. The distribution agent 108 may divide the shipment into the appropriate quantities for each of the 100 kiosks 110 to which the distribution agent 108 is assigned. For example, kiosks 110 located in heavily trafficked areas may be stocked with more vitamin packets (e.g., downtown in a business-heavy area) than kiosks 110 in more remote areas (e.g., residential suburbs).

Figure 7:
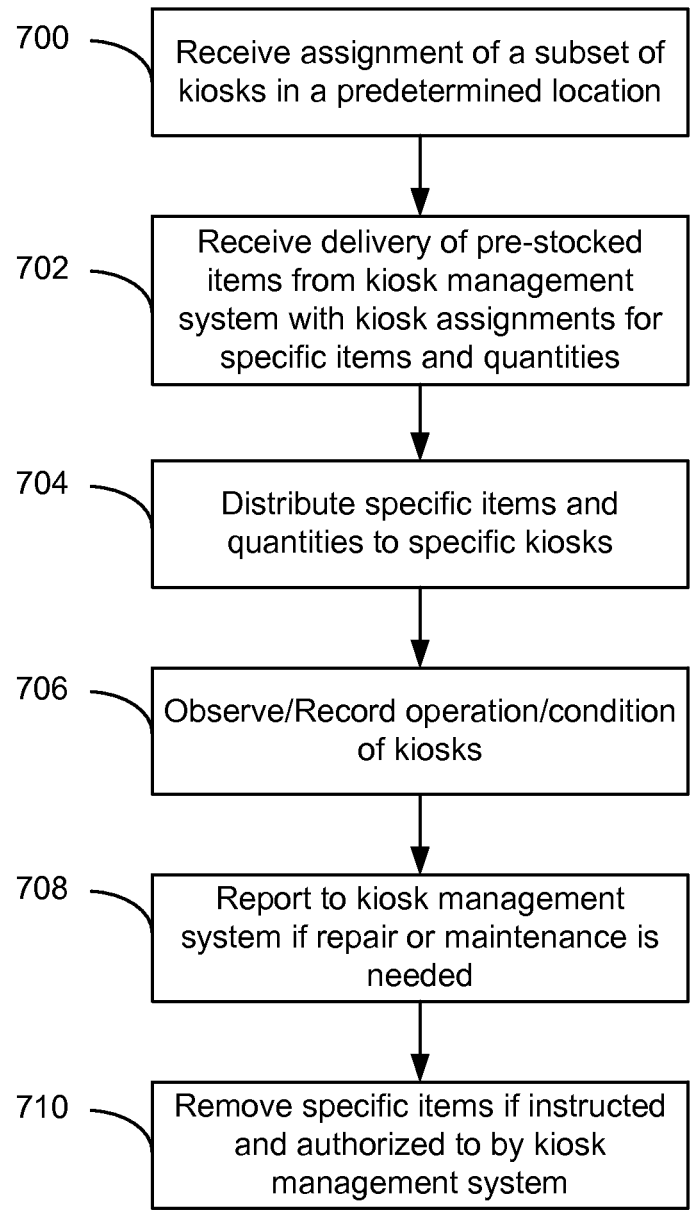
FIG. 7 shows a flow diagram illustrating an example process followed by a distribution agent of the distribution system shown in FIG. 1 to deliver and maintain kiosks.

FIG. 7 shows a flow diagram illustrating an example process followed by a distribution agent 108 of the distribution system shown in FIG. 1 to deliver and maintain kiosks. At 700, a distribution agent 108 may receive an assignment from the kiosk management system 102 including a subset of kiosks 110 to monitor, manage, maintain, and deliver to. The subset of kiosks 110 may be within a radius of a predetermined location suitable to the distribution agent 108. For example, a distribution agent 108 may receive an assignment of 100 kiosks 110 within 10 miles of his or her home.

At 702, the kiosk management system 102 may cause an inventory entity 104 to send a consolidated shipment of items to the distribution agent 108. The distribution agent 108 may receive delivery of the pre-stocked items and/or requested items from the kiosk management system 102. The delivery of the pre-stocked items and/or requested items may also include a manifest that identifies which kiosks 110 to deliver which items to and the quantity of each item.

Subsequently at 704, the distribution agent 108 may deliver the specific items and quantities to each of the kiosks 110 within his or her assignment. During the distribution agent's visit to each kiosk 110, the distribution agent 108 may observe and record the status of the kiosk 110, as shown at 706. For example, the distribution agent 108 may check that the kiosk 110 is operational and record the current inventory of items for confirmation at the kiosk management system 102.

At 708, the distribution agent 108 may report the operation and/or condition of the kiosk 110, such as if repairs or maintenance (e.g., cleaning) is needed, to the kiosk management system 102 in a communication. For example, the distribution agent 108 may report to the kiosk management system 102 if there is graffiti on the kiosks that needs to be cleaned off. The report may be transmitted via communications network in the form of an electronic mail, instant message, text message, SMS, or any other suitable communication or message to the kiosk management system 102.

Further, at 710, if there are items in the kiosks 110 that are not selling well, and/or if requested items have not been retrieved by a consumer 112 within a time limit, the distribution agent 108 may remove these items to make room for other pre-stocked items or requested items. Additionally, the distribution agent 108 may transfer items from one kiosk to another, depending on inventory and storage needs instructed by the kiosk management system 102. The distribution agent 108 may receive instructions from the kiosk management system 102 via a communications network in the form of an electronic mail, instant message, text message, SMS, or any other suitable communication or message.

In one example, a kiosk may be located at a bank and the bank may operate as a distribution agent for the kiosk management system. The kiosk management system may ship to the bank (Mon-Fri) and pay the bank employees to stock the pre-stocked items into the kiosks. In some embodiments, the bank employees or bank as a distribution agent may receive a portion of the profits resulting from items sold at their corresponding kiosk(s). For example, the distribution agent may receive 1% of the profits, such as $0.25 for every $25 earned by the kiosks assigned to the distribution agent.

As such, the kiosk management system can provide benefits to both the distribution agents and the consumer, providing convenience to the consumer while increase traffic and potential business at the distribution agent. Businesses acting as distribution agents hosting the kiosks can be compensated by maintaining the kiosks and thus be incentivized to properly maintain the kiosks for consumers coming to retrieve items. The consumers may also be likely to conduct additional transactions at the business acting as distribution agent. The operations of shipping orders and distribution of the items can be divided between the kiosk management system ordering a consolidated shipment of items to the distribution agent, the distribution agent distributing the items to individual kiosks, and the consumer retrieving the items from the kiosks. As a result, shipping costs charged to the consumer may be close to negligible and the shipping costs to the kiosk management system may be reduced, while providing incentives for the distribution agents as well. Thus, in embodiments, the advantages can be appreciated by all parties involved (e.g., the kiosk management system, distribution agents, and consumers).

Figure 8:
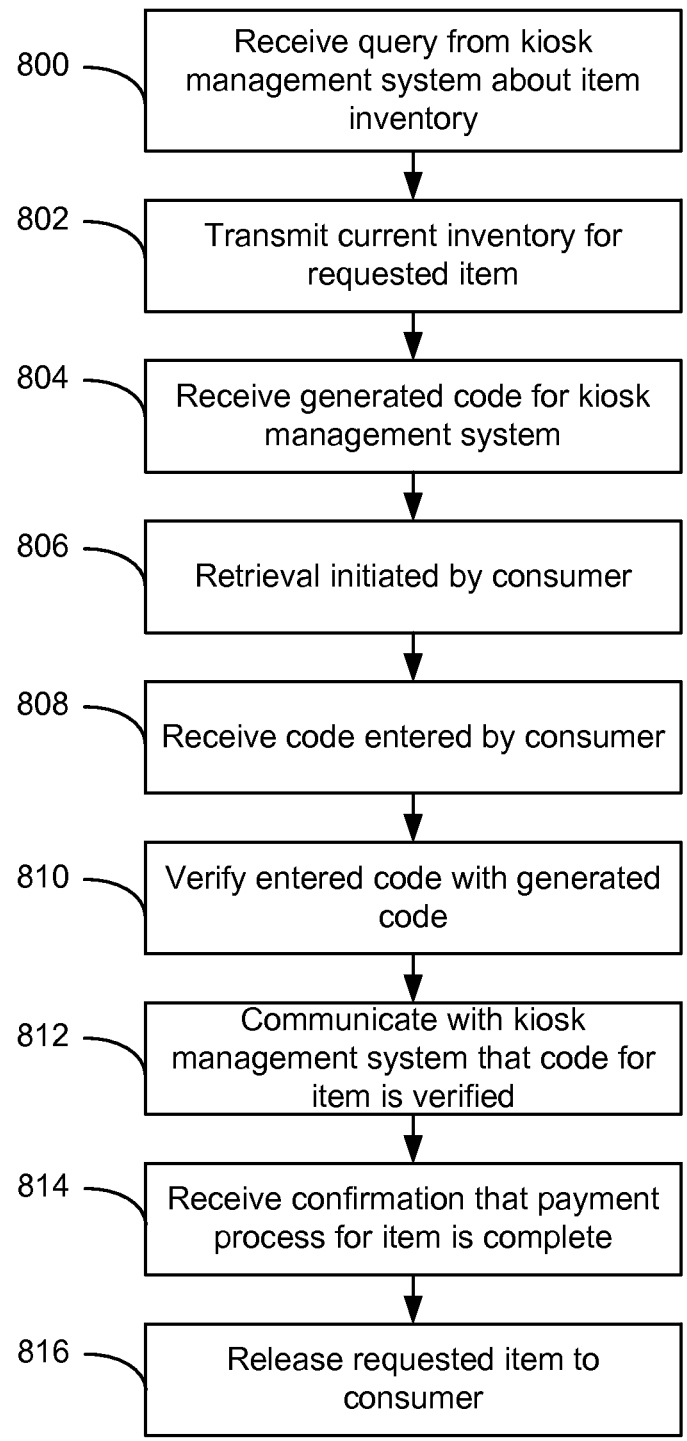
FIG. 8 shows a flow diagram illustrating an example method implemented by the kiosk of FIG. 6 to process an order from a consumer for an item.

FIG. 8 shows a flow diagram illustrating an example method implemented by the kiosk 600 of FIG. 6 to process an order from a consumer for an item. In some embodiments, after the kiosk management system 102 receives a request for an item from a consumer, the kiosk 600 may receive a query from the kiosk management system 102 at 800. The query may include a request for current inventory information associated with the requested item stored in the kiosk 600. In response, at 802, the kiosk 600 may transmit the current inventory information for the requested item to the kiosk management system 102. Alternatively, the kiosk 600 may send current inventory information for a plurality of items stored in the kiosk 600 to the kiosk management system 102.

Then, a generated code from the kiosk management system 102 may be received by the kiosk 600, as shown at 804. The generated code may be generated by the kiosk management system 102 as described above. When the consumer initiates retrieval of the requested item at 806, the kiosk 600 may prompt the consumer to enter the generated code via the consumer interface 612. The kiosk 600 may then receive an entered code at 808. At 810, the kiosk 600 may verify the entered code with a generated code locally. When the entered code is verified, the kiosk 600 can be authorized to release the requested item to the consumer, e.g., via vending components 606. Then at 812, the kiosk 600 may transmit a communication to the kiosk management system 102 with the entered code and an indication that the entered code is verified, such that the kiosk management system 102 receives an indication that a retrieval of the requested item is initiated with a verified code. Accordingly, the kiosk management system 102 may initiate payment processing of the transaction.

At 814, the kiosk 600 can receive a confirmation from the kiosk management system 102 that the code is verified, and that payment processing for the requested item has been initiated to complete the transaction. The confirmation from the kiosk management system 102 may also include an authorization from the kiosk management system to release the requested item to the consumer, e.g., via vending components 606. When the payment processing is complete, finally, at 816, the kiosk 600 can release the requested item to the consumer.

In an example, if a consumer orders more than one item for retrieval from the kiosk 600, the kiosk 600 may determine an associated order number with the entered code from the consumer and may be programmed to release the items for that order number via the vending components 606 all at once or in groups. For example, the kiosk 600 may release a group of three items and then wait for those three items to be removed before it releases additional items to prevent items from getting stuck or lodged in the vending components 606 of the kiosk 600. If the consumer needs help with lodged items at the kiosk 600 or another functional issue with the kiosk 600, the consumer may communicate with the kiosk management system 102 through the consumer interface 612 of the kiosk 600 or via the mobile application 114 described above. Alternatively, the kiosk 600 and/or the kiosk management system 102 may communicate with the assigned distribution agent 108, such as via an electronic message, to instruct the distribution agent to attend to the consumer at the kiosk 600.

Requested items may be reserved and stored in the kiosk 600 for a limited amount of time, for example, for up to 15 business days and 6 weekend days. The designated time period for pick up may be determined by the consumer requesting the items or may be a default length of time designated by the kiosk management system 102 or the kiosk 600. The kiosk management system 102 or kiosk 600 may send reminder notifications to the consumer or to a recipient to retrieve the items from the designated kiosk. If the items are not picked up within the designated time period, the reserved items may be made available for other consumers to request and purchase. In some embodiments, when one or more of requested custom items that are excluded from the items with which some of the kiosks are pre-stocked, the requested custom items may be returned to the kiosk management system 102, inventory entity 104, external retailer 116, or seller, so that a portion of the storage area 608 of the kiosk 600 may be made available for items.

Figure 9:
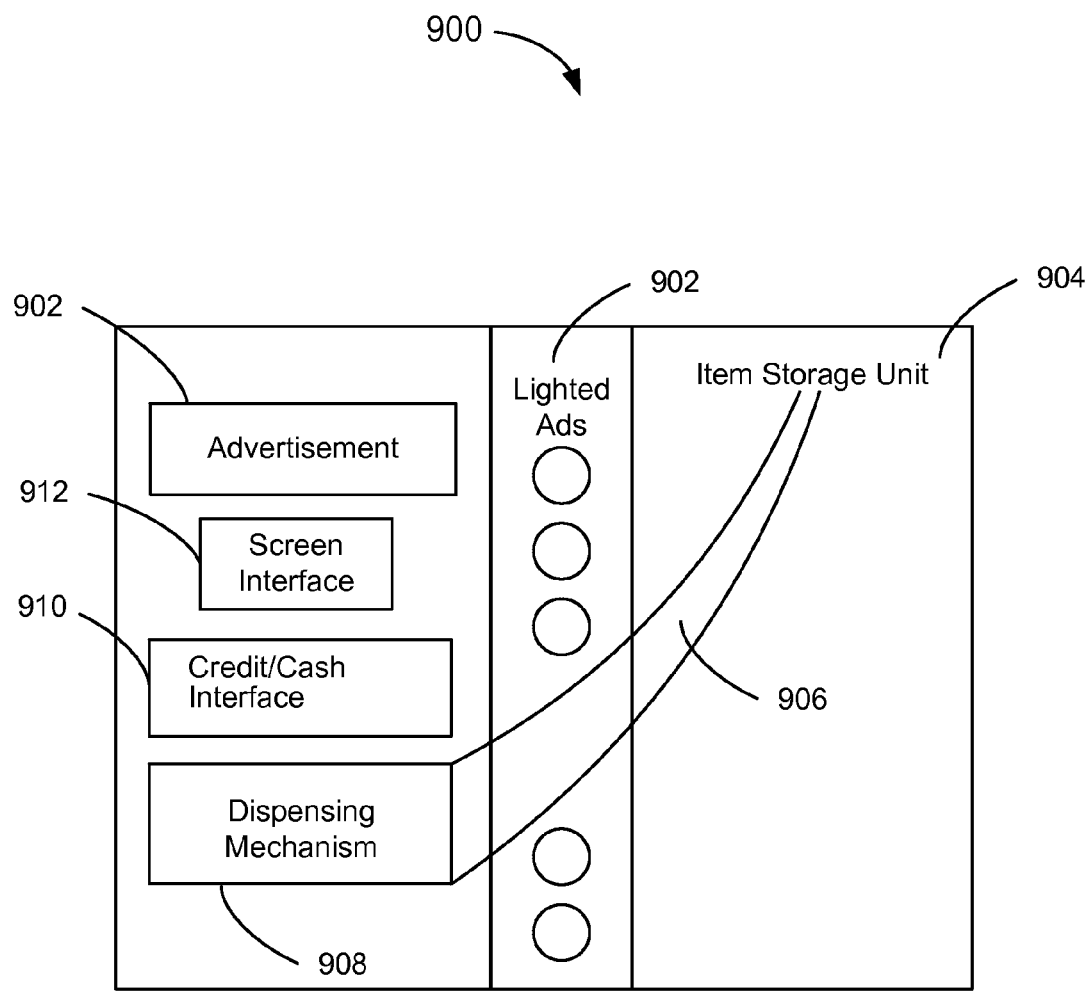
FIG. 9 shows an example external interface of a kiosk of the distribution system shown in FIG. 1.

FIG. 9 shows an example external interface of a kiosk 900 found in the distribution system shown in FIG. 1. Kiosk 900 may have a screen interface 912 to display messages to the consumer. The screen interface 912 may be a touchscreen that can also receive input from the consumer. In other embodiment, the screen interface 912 may only provide output to the consumer, and a separate keypad (not shown) may be provided to the consumer to provide input to the kiosk 900. The kiosk 900 may further include an Item Storage Unit 904 that stores a plurality of items. The Item Storage Unit 904 may be opaque such that the items stored may not be visible to provide security, protection and preservation of items, for example, to keeping vitamins out of sunlight or deter thefts of small electronic devices since they cannot be seen, as opposed to being displayed in a visible glass display. The Item Storage Unit 904 may be connected to a Dispensing Mechanism 908 by a Releasing Mechanism 906. For example, the Releasing Mechanism 906 may be a mechanical arm, hook or any other suitable device that is configured to release a specific item from the Storage Unit 904 and transport it to the Dispensing Mechanism 908. The Dispensing Mechanism is then configured to provide the requested item to the consumer for retrieval.

The kiosk 900 may further include a payment interface to accept cash or credit cards 910. Alternatively to conduct payment, the consumer may log-in with pre-registered account information or provide payment information via the screen interface 912. Additionally, digital advertisements may be displayed in 902. The digital advertisements may be manipulated and customized remotely and instantly based on various factors, such as environmental factors, including geographical location, weather, and time, and/or transactional factors, including transaction history, item inventory, etc.

Figure 10:
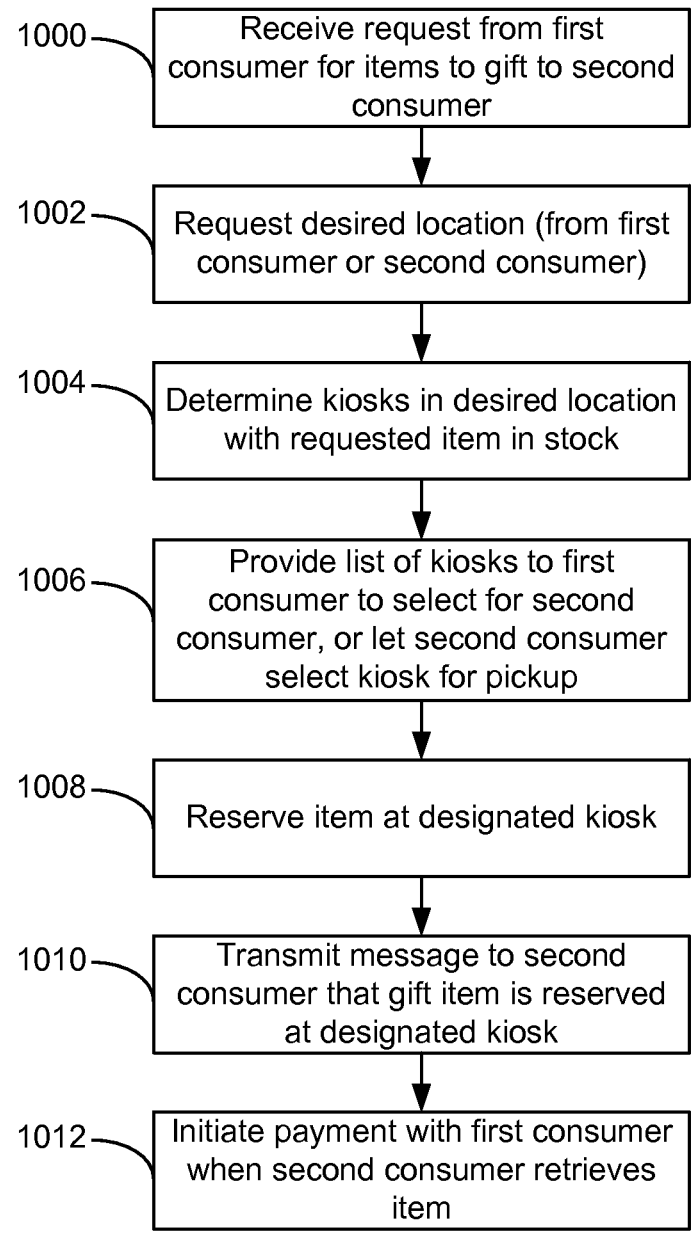
FIG. 10 shows a flow diagram illustrating an example method implemented by the kiosk management system of FIG. 3 to designate a recipient to receive an item as a gift and enable the recipient to retrieve the item from a kiosk.

In another embodiment, a consumer may wish to designate a recipient to receive the requested item as a gift. Accordingly, FIG. 10 shows a flow diagram illustrating an example method implemented by the kiosk management system 102 to designate a recipient to receive an item as a gift and enable the recipient to retrieve the item from a kiosk 110. At 1000, a consumer may request to purchase an item (e.g., a gift) for a recipient. This request from the consumer may be received by the kiosk management system 102 and may indicate that the requested item will be retrieved from a kiosk 110 by the recipient. Alternatively, the request may be transmitted by the consumer via a retail website 106 or mobile application 114 operated by the retailer 116. The request may be transmitted via communications network in the form of an electronic mail, instant message, text message, SMS, or any other suitable communication or message.

At 1002, the kiosk management system 102 may request a desired pick up location. The desired pick up location may be a desired geographic area. The desired pickup location may be designated by the consumer from which the request originated, or alternatively, the kiosk management system 102 may transmit a request to the recipient for a desired pickup location. Thus, the consumer may designate the desired location for the recipient, for example, at a kiosk 110 by the recipient's office. In other embodiments, the recipient may receive a communication from the kiosk management system 102 that a gift has been purchased for him or her, and that he or she may set a desired location for pickup of the gift. The communication may be transmitted via communications network in the form of an electronic mail, instant message, text message, SMS, or any other suitable communication or message, such as through a retail website 106, link, or mobile application.

Next, based on the location received from either the consumer or the recipient, the kiosk management system 102 may determine a subset of kiosks 110 within a predetermined proximity to the location, as shown at 1004. The kiosk management system may identify the kiosks within the geographical area that have the item and then ask the requester (whether consumer or recipient) to select one of the identified kiosks within the geographical area. The kiosk management system 102 may also determine whether the gift is in stock in the subset of kiosks 110 within the predetermined proximity of the location.

At 1006, the kiosk management system 102 may communicate a list of the subset of kiosks 110 having the gift within the predetermined proximity of the location to the consumer or the recipient. The communication may be transmitted via communications network in the form of an electronic mail, instant message, text message, SMS, or any other suitable communication or message, such as through a retail website, link, or mobile application. In the embodiment where the consumer originating the request for the gift designates the preferred location, the list of subset of kiosks is provided to the consumer for selection of a designated kiosk 110. In the embodiment when the recipient designates the preferred location, the list of the subset of kiosks is provided to the recipient for selection of a designated kiosk 110.

Subsequently, the gift is reserved at the designated kiosk 110 by the kiosk management system at 1008 so that it may not be retrieved from the kiosk by another consumer. Then at 1010, the kiosk management system 102 generates and transmits a message to the recipient that the gift is reserved and available at the designated kiosk 110 for retrieval by the recipient. The message may be transmitted via communications network in the form of an electronic mail, instant message, text message, SMS, or any other suitable communication or message, such as through a retail website, link, or mobile application.

When the recipient is notified that the requested item is available at 1010, the notification may also include a generated code. The generated code can be a generated by the kiosk management system 102 and/or retailer 116. The generated code may be an alphanumeric code or a bar code as described above. The generated code may be unique to the transaction, consumer, kiosk, and/or item. In other embodiments, the generated code may be associated with the kiosk, consumer, transaction, and/or item for identification purposes. In other embodiments, the kiosk management system 102 includes the generated code in a communication to the kiosk to reserve the requested items at the kiosk at 1008. The notification may be transmitted via communications network in the form of an electronic mail, instant message, text message, SMS, made available in the mobile application 114 or any other suitable communication or message.

To initiate retrieval of the gift from the designated kiosk 110, the recipient may be prompted to enter the generated code when recipient arrives at the designated kiosk. In an embodiment, the gift may be reserved for a limited amount of time such that the recipient is requested to retrieve the gift within a certain time period. The time period may be a default time period determined by the kiosk management system 102 or retailer 116. Alternatively, the time period may be determined by the consumer originating the request. The recipient may be prompted via the external interface of the designated kiosk, or via a user interface presented on the recipient's mobile device via a mobile application when it is in proximity of the designated kiosk detected by Bluetooth, near-field communications (NFC), radio-frequency integrated device (RFID), wireless network, or other suitable contactless communication. To enter the generated code, the recipient may use the external interface of the kiosk, such as a keypad or a touchscreen to manually enter the code. In another embodiment, the mobile application operated on the recipient's mobile device may communicate the code to the kiosk, e.g., via Bluetooth connection or other wireless communication. Once entered, the designated kiosk 110 may communicate with the kiosk management system 102, as shown at 1012, to verify the generated code. Once the code is verified, the kiosk management system 102 may initiate payment processing of the originating consumer's account information and payment information.

Once payment is initiated (or in some embodiments, after the code is verified), the kiosk management system 102 may release the gift for retrieval by the recipient. In embodiments where the kiosk management system 102 sends a communication to the designated kiosk with the generated code, the designated kiosk may verify the generated code locally when the recipient enters the code to release the gift. The transaction is complete when the kiosk management system 102 process payment using the originating consumer's account information and payment information and instructs release of the gift from the designated kiosk 110 to the recipient. Retrieving the gift may involve the recipient going to the designated kiosk to have the gift released from the kiosk so that the recipient can take the gift home. Releasing the gift may include dispensing the gift to the recipient, or unlocking an individual compartment or module securing the gift for the recipient.

Figure 11:
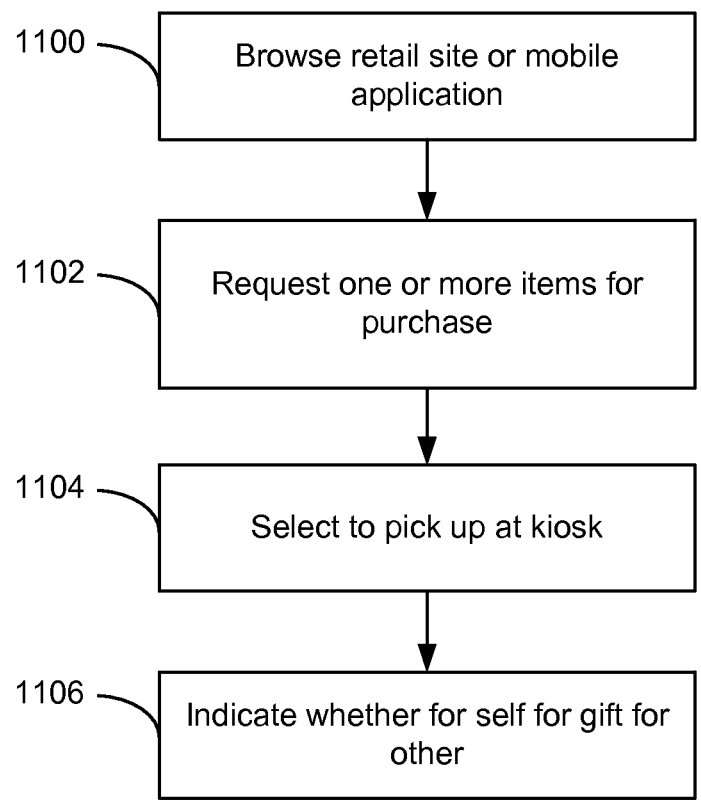
FIG. 11 shows a flow diagram illustrating an example process followed by a consumer to gift an item to a recipient.

FIG. 11 shows a flow diagram illustrating an example process followed by a consumer to gift an item to a recipient. At 1100, the consumer may browse a retail website or on a mobile application on his or her mobile device. The pre-stocked items available pre-stocked at various kiosks or eligible items to be delivered to various kiosks may have an icon, stating that they are eligible and/or a number of kiosks in your zip code that already have the selected item in stock.

At 1102, the consumer may select an item. In some embodiments, the consumer may be notified that the dollar amount of the selected item does not substantiate shipping it to the home delivery address of the consumer. The consumer may be offered to add more items to meet a minimum threshold for shipping directly to his or her home. Alternatively, the consumer may be informed that the kiosk management system may deliver the requested item to a designated kiosk for the consumer to pick up. The shipping cost offered to the consumer for kiosk pick-up may be free (and effectively negligible to the kiosk management system) or significantly reduced compared to if the consumer had the item directly shipped to his or her home.

Once the consumer determines the requested item for purchase and delivery method, the website or mobile application may provide a drop down menu or list of every kiosk within a predetermined proximity of the location designated by the consumer. At 1104, the consumer may then elect to have the requested item(s) picked up at a kiosk.

At 1106, the consumer may then be prompted whether the requested item is for herself or himself to pick up, or whether it is a gift for a recipient to pick up. In some embodiments, a generated code is sent to the consumer and/or recipient for use in verifying the transaction at the kiosk.

Figure 12:
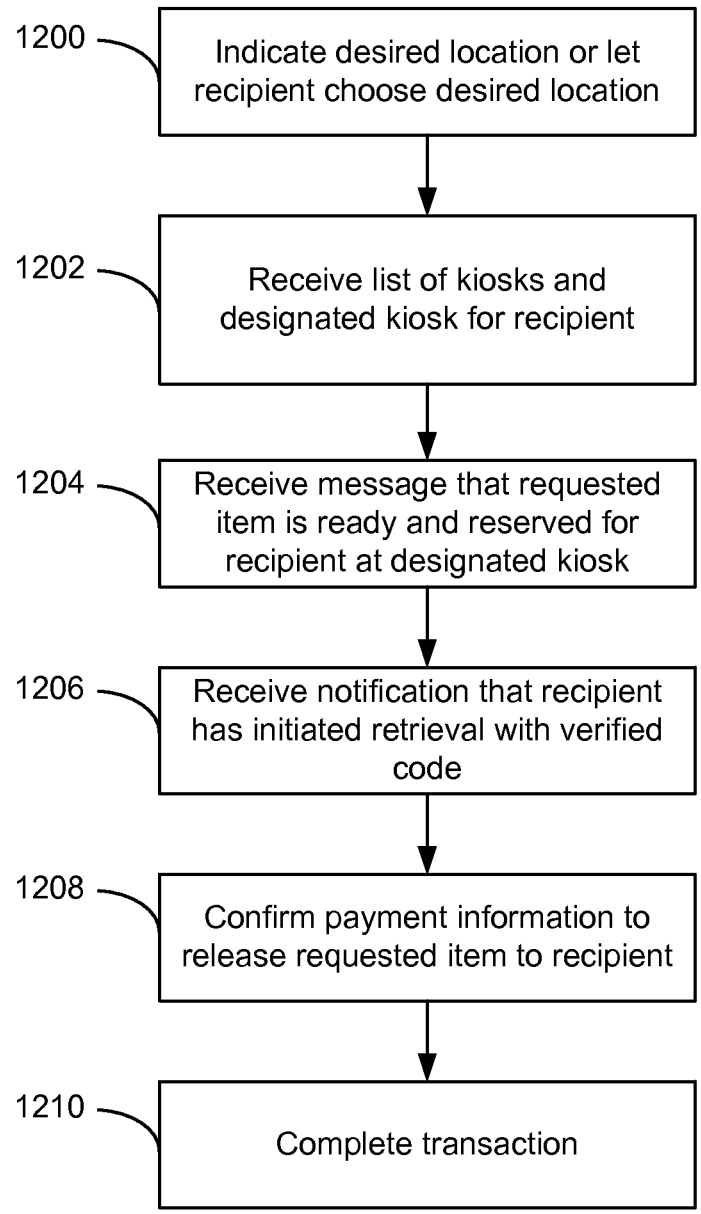
FIG. 12 shows flow diagrams illustrating an example process followed by a consumer to retrieve an item via a kiosk.

FIG. 12 shows flow diagrams illustrating an example process followed by a consumer to retrieve an item via a kiosk. In another embodiment in which the requested item is a gift for a recipient, referring to FIG. 12, at 1200, the consumer may either indicate a preferred location for the recipient or elect to let the recipient choose his or her preferred location. At 1202, the consumer or recipient may receive a list of kiosks with the requested items in stock that are within a predetermined proximity of the preferred location, either designated by the consumer or the recipient, respectively. The consumer or recipient may then select a different designated kiosk.

Subsequently, at 1204, the recipient may receive a notification that a gift is available and reserved for the recipient at the designated kiosk. The notification may include a generated code for the recipient to access and retrieve the gift.

The consumer may then may receive a notification or communication at 1206 that the recipient has initiated retrieval of the gift with a verified code. The consumer may receive a confirmation of payment information at 1208, and then the requested item is released to the recipient at 1210 to complete the transaction.

Figure 13:
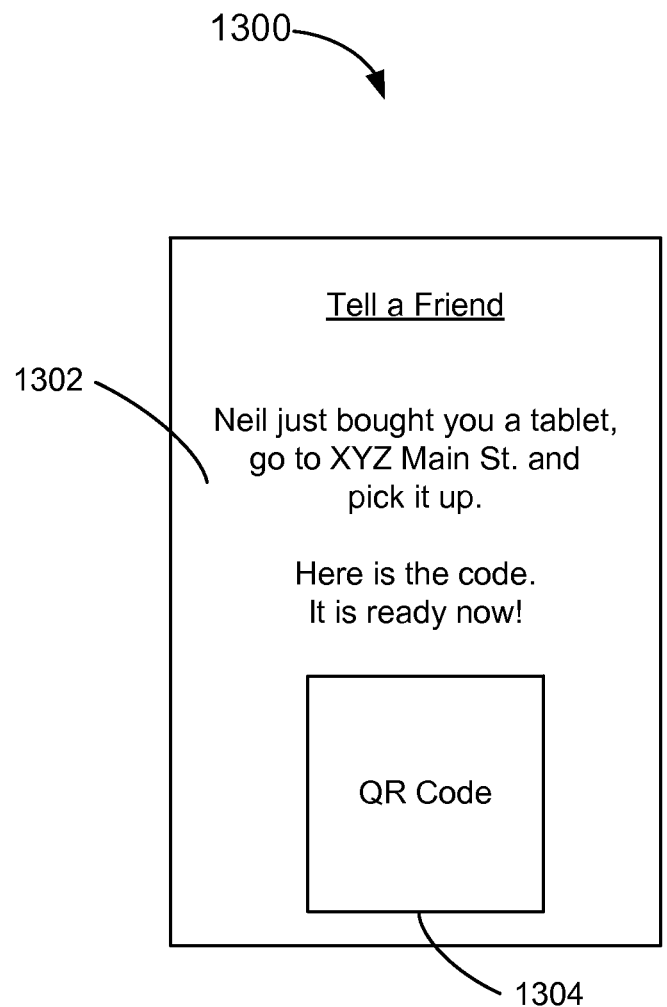
FIG. 13 shows an example user interface of a mobile application presented on a mobile device via which a recipient can initiate retrieval of a gift from a kiosk.

FIG. 13 shows an example user interface of a mobile application presented on a mobile device via which a recipient can initiate retrieval of a gift from a kiosk. Screen 1304 may include a message to the recipient, indicating the consumer, item, and location, as shown in 1302. The message may further include a QR code 1304, or any other suitable code that the recipient may use to initiate retrieval of the gift at the kiosk. The QR code or other code may be scannable by the kiosk via any suitable scanning interface, such as an optical device. In another embodiment, the recipient may be prompted via the external interface of the designated kiosk, or via a user interface presented on the recipient's mobile device via a mobile application when it is in proximity of the designated kiosk detected by Bluetooth, near-field communications (NFC), wireless network, or other suitable contactless communication.

Figure 14:
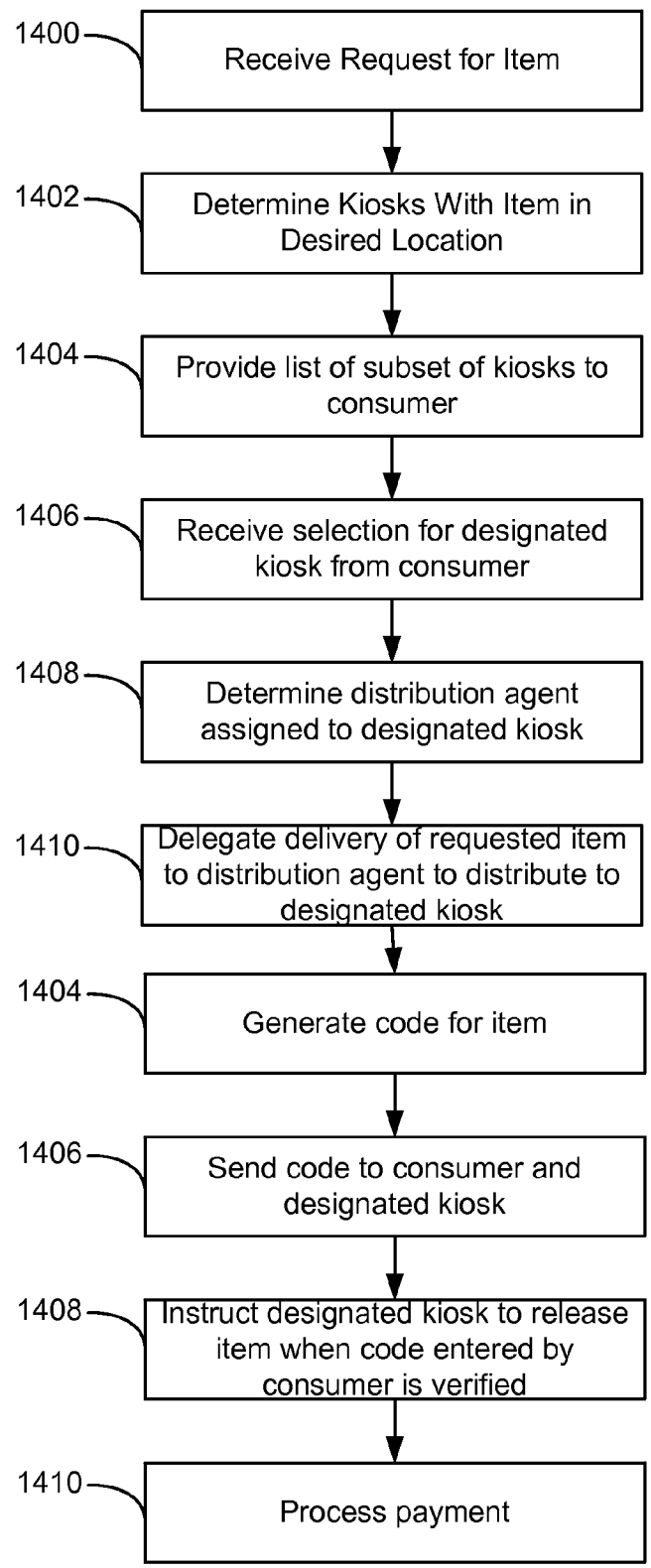
FIG. 14 shows a flow diagram illustrating an example method implemented by the kiosk management system of FIG. 3 to process a request for an item that is excluded from the pre-stocked items in the kiosks.

In another embodiment, a consumer may request an item that is excluded from the pre-stocked items in nearby kiosks 110, or request an item that is currently out of stock in nearby kiosks 110. FIG. 14 shows a flow diagram illustrating an example method implemented by the kiosk management system to process a request for an item that is excluded from the pre-stocked items in the kiosks. At 1400, the kiosk management system 102 can receive a request for an item from a consumer. A subset of kiosks 110 may then be determined at 1402 based on a preferred location designated by the consumer. For example, the subset of kiosks 110 may be within a predetermined proximity of the preferred location. The predetermined proximity may be determined by the consumer or a default value determined by the kiosk management system 102.

At 1404, a list identifying the subset of kiosks 110 can be provided to the consumer for selection of a designated kiosk. The list may be displayed to the consumer via a webpage or a mobile application operated by the kiosk management system or by the retailer. Alternatively, the list may be provided in a communication via a communications network, in the form of an electronic mail, instant message, text message, SMS, social networking post, or any other suitable communication or message. When a designated kiosk 110 is selected from the list by the consumer, the selection may be transmitted to the kiosk management system 102, as shown at 1406. After the kiosk management system 102 receives the selection of the designated kiosk 110, the kiosk management system 102 at 1408, may identify the designated kiosk's corresponding distribution agent 108 that has been assigned by the kiosk management system 102 monitor, maintain and deliver items to the designated kiosk 110.

Subsequently at 1410, the kiosk management system 102 may instruct the corresponding distribution agent 108 to deliver the requested item in a consolidated shipment with other items for the corresponding distribution agent to deliver to individual kiosks in the subset of kiosks 110 to which the distribution agent 108 is assigned. Instructions may be provided to the distribution agent 108 through electronic transmissions communicated over any suitable communications network, such as email, text, or SMS transmitted via a telecommunications network. Alternatively, instructions and assignments of the individual kiosks assigned to the distribution agent 108 may be communicated to the distribution agent 108 via postal service or any suitable mail service. The kiosk management system 102 may also call the distribution agent 108 to provide instructions verbally over the telephone using an automated message or a representative of the kiosk management system 102. Then, the kiosk management system 102 may instruct a consolidated shipment of items, including the requested item, to the distribution agent 108. In some embodiments, delivery to the distribution agent 108 may involve the kiosk management system 102 instructing an inventory entity 104 to ship the items.

At 1412, the kiosk management system 102 may generate a code for association with the transaction for the requested item. As described above, the code may be, e.g., a randomly generated code, a bar code, etc. In some embodiments, the code may be generated using a unique identifier for the transaction, the requested item, the consumer, and/or the designated kiosk.

After generation of the code, the kiosk management system 102 may send a communication to the consumer and/or the designated kiosk 110 at 1414. The communication to the designated kiosk 110 may include the generated code. The communication to the consumer may include the generated code, as well as a notification to the consumer that the requested item has been delivered and is ready/reserved for the consumer to pick up at the designated kiosk. The communication may be via a communications network, in the form of an electronic mail, instant message, text message, SMS, social networking post, or any other suitable communication or message.

At 1416, when the consumer initiates retrieval of the requested item for the designated kiosk 110, the designated kiosk may prompt the consumer via an external interface (as will be described below) to enter the generated code. In one embodiment, the kiosk transmits the generated code to the kiosk management system 102 for verification. In other embodiments, the designated kiosk 110 verifies the generated code locally at the designated kiosk. When the generated code is verified, the kiosk management system 102 may authorize the designated kiosk 110 to release the requested item to the consumer. In yet other embodiments, when the generated code is verified (either by the kiosk management system 102 or the designated kiosk 110), the designated kiosk 100 is automatically authorized to release the requested item to the consumer without requiring further instruction or authorization from the kiosk management system.

Finally at 1418, the transaction for the requested item is completed when the kiosk management system 102 initiates payment processing for the transaction using the consumer's account information and payment information. In some embodiments, the designated kiosk then releases the requested item to the consumer.

According to embodiments described herein, a recipient or other consumer may have a variety of items reserved for pick up at a kiosk 110 for a reduced shipping cost to the consumer. Reduced operations, inventory, and delivery costs to the kiosk management system 102 and/or retailer 116 may also be significantly reduced. Further the kiosk management system 102 and/or retailer 116 may offer a broader selection of items. For example, the consumer may not be limited to the items that are pre-stocked in, or pre-selected for, specific kiosks in particular locations. The consumer may request that any item available from the kiosk management system 102 and/or retailer 116 be delivered, using distribution agents, to a kiosk of the consumer's choice, for a reduced shipping cost compared to the cost of shipping had the consumer requested deliver directly to his or her home.

Figure 15:
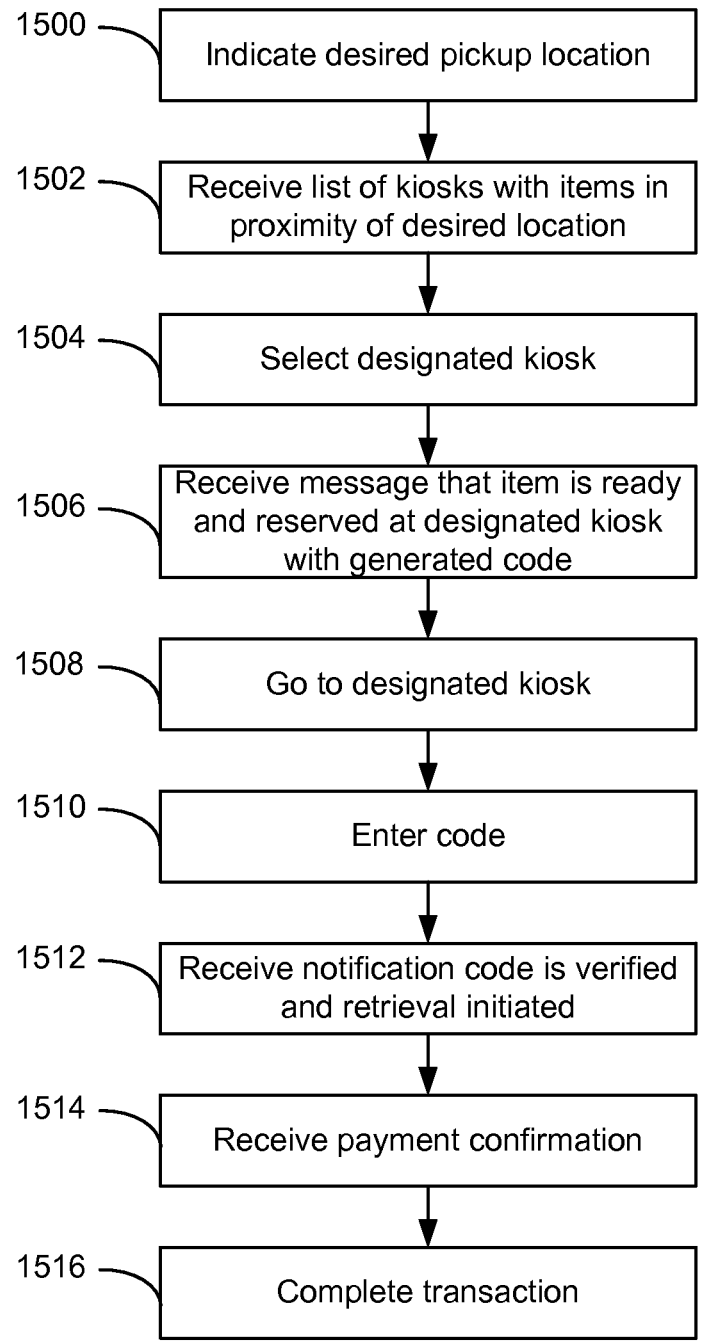
FIG. 15 shows a flow diagram illustrating an example process followed by a consumer to retrieve an item via a kiosk.

FIG. 15 shows a flow diagram illustrating an example process followed by a consumer to retrieve an item via a kiosk. In an embodiment where the consumer has requested an item for herself or himself, referring to FIG. 15, at 1500, the consumer may indicate a preferred pickup location. The pickup location may be automatically detected to be the consumer's billing or shipping zip code, or the GPS location of the mobile device of the consumer may be detected. Alternatively, the consumer may manually designate another location, such as a future location at which the consumer will be located.

Next, at 1502, the consumer may receive a list of kiosks with the requested items in stock that are within a predetermined proximity of the preferred location. The consumer may then select a designated kiosk at 1504.

Subsequently, at 1506, the consumer may receive a notification that the requested item is available and reserved for the consumer at the designated kiosk. The notification may include a generated code for the consumer to access and retrieve the requested item.

The consumer may then travel to the designated kiosk at 1508, and enter the generated code at 1510. When the entered code is verified, at 1512, the consumer may receive another notification or communication that the entered code was verified and that retrieval of the requested item has been initiated. The consumer may receive a confirmation of payment information at 1514, and then the requested item is released at 1516 to complete the transaction.

As described herein, in some embodiments a mobile application operated on a mobile device may be used by a consumer to conduct a transaction for a requested item. For example, any of the steps described in FIGS. 11, 12, and 15 may be conducted using a mobile application.

Figure 16:
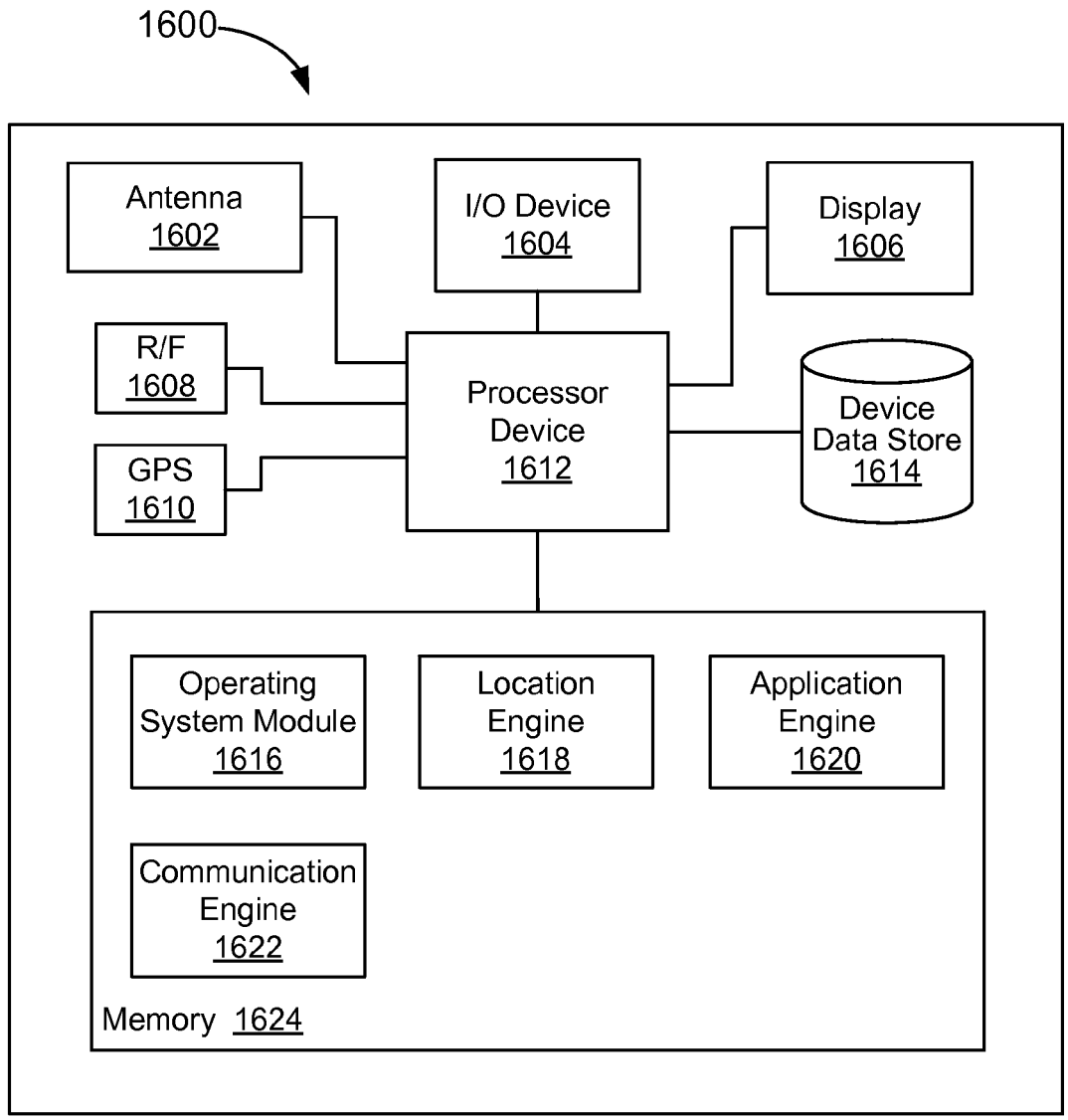
FIG. 16 shows an example mobile device via which a recipient can initiate retrieval of a gift from a kiosk.

FIG. 16 shows an example mobile device via which a recipient can initiate retrieval of a gift from a kiosk. The mobile device 1600 may include a processor device 1612 and a non-transitory computer readable medium 1624. The processor device 1612 may be operatively coupled to several hardware components. For example, the processor device 1612 may be coupled to an input/output device 1604 (e.g., keyboard) and display 1606 (e.g., LCD screen) to provide an interface to the consumer. To communicate with networks and transmit and receive data, the processor device 1612 may be further coupled to an antenna 1602 or radio-frequency integrated device 1608 (RFID). The mobile device 1600 may be configured to connect to the Internet, Wi-Fi, or other telecommunication network(s). The mobile device may be further configured to connect via Bluetooth. To determine a location of the mobile device, there may be a global positioning system (GPS) module 1610.

The processor device 1612 may be further coupled to a data store 1610 storing information related to the mobile device and/or the consumer. For example, the mobile device identification number (e.g., IMEI), or mobile device identifier (e.g., phone number). Additionally, the computer readable medium 1624 may include several software modules containing code executable by the processor device to perform one or any of the functions described above. For example, the computer readable medium 1624 may include an operating system module 1616, a location engine 1618, a mobile application engine 1620, and a communication engine 1622. The location engine 1618 may be in communication with the GPS module 1610 to determine and transmit a location of the mobile device. The mobile application engine 1620 may operate a mobile application on the operation system maintained by the operating system module 1616 to conduct the functions described in at least FIGS. 11, 12 and 15. The mobile device 1600 may be configured to transmit and receive messages, communications, and data using the communications engine 1622.

Figure 17:
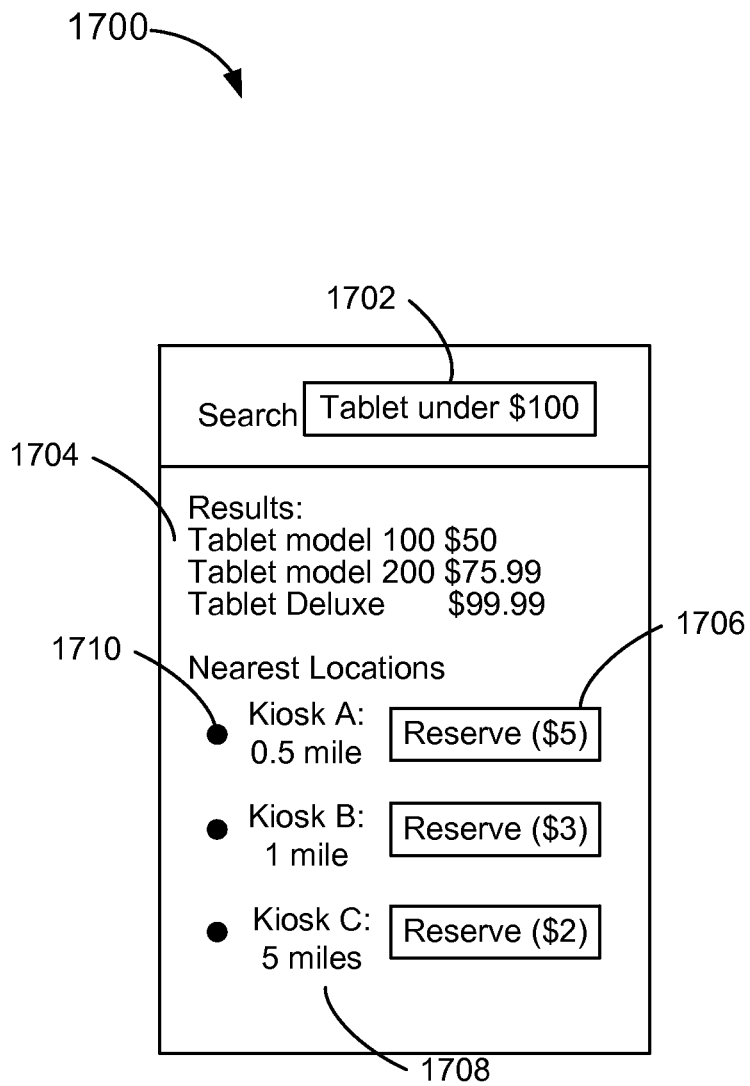
FIG. 17 shows an example user interface of a mobile application presented on a mobile device via which a consumer can select a kiosk from which to reserve an item.

FIG. 17 shows an example user interface of a mobile application presented on a mobile device via which a consumer can select a kiosk from which to retrieve an item according to at least an embodiment. For example, the consumer may launch the mobile application on his or her mobile device (e.g., mobile phone, tablet) or view a network site operated by the kiosk management system showing screenshot 1700. The consumer can view websites from a laptop computer, mobile device, or any other computing device capable of connecting to the Internet through a wire or wireless connection. As shown in FIG. 17, the consumer may be prompted with a Search Box 1702. The consumer may enter keywords, a specific item, category, type, price, identification number, etc. into the Search Box 1702. For example, as shown in FIG. 17 in Search Box 1702, the consumer may search for a "tablet under $100." Other examples of search inquires may be "organic dog food", "gifts under $25", "ISBN 123456789", "Brand XYZ apparel in San Francisco", or any other suitable search query with any number of restrictions or limitations based on the consumer's preferences, including but not limited to, price, category, product information, identifiers, location, etc.

In an embodiment, a location of the consumer may be automatically detected. For example, on a mobile device such as a mobile smartphone, GPS may be used to determine the consumer's location on the street. In another example, an IP address or other location identifying information may be determined from a computer the consumer is using to access the network site. When the location of the consumer is determined, a list of relevant items based on the search query may be provided in 1704 to the consumer, and a list of the nearest locations of kiosks 1710. The list of relevant items may include the item name and price, or any other relevant information. In some embodiments, the consumer may click on the item to get more item information, such as reviews and detailed description. The list of closest kiosks 1710 to the consumer's location may include the distance from the consumer 1708, and the list may be arranged by distance. For example, the closest kiosk is 0.5 miles away and may be listed first, and the further kiosk that is 5 miles away is listed last, as shown in the list 1710 arranged by distance 1708.

Each kiosk may have an option for the consumer to reserve the item at the designated kiosk, as shown by 1706. The consumer may select to reserve the item via a link or button for the consumer to click on using a mouse or select using his or her finger on a touchscreen, or any other suitable method for the consumer to select the option to reserve in 1706. The option of reserve 1706 may further provide other details to the consumer, for example, which relevant items are available at that kiosk, and associated reserve fees. For example, the consumer may wish to go to the nearest kiosk, Kiosk A, which is 0.5 miles away from the consumer's location. The consumer may be able to select Kiosk A and view which tablet versions shown in the Result item list 1704, are available at Kiosk A. The consumer may have the option to reserve a Table model 200 for $75.99 at Kiosk A for a $5 reserve fee. If the consumer wants a lower reserve fee, the consumer may select another kiosk, such as Kiosk B 1 mile away, to see if the Tablet model 200 is available and only pay a reserve fee of $3. Alternatively, the consumer may also choose another relevant item, such as the Tablet Deluxe for $99.99 and only pay a $2 reserve fee at Kiosk C, 5 miles away. Accordingly, the consumer is given flexibility in choosing which relevant items to purchase, where to purchase and pick them up, and at what total price (including reserve fee). In other embodiments, there may be no reserve fee. The reserve fee may be determined based on location, transaction information (e.g., price of the item), convenience to the consumer, location, and/or any other variables. In another embodiment, the same item may have varying prices at different kiosks and locations.

Figure 18:
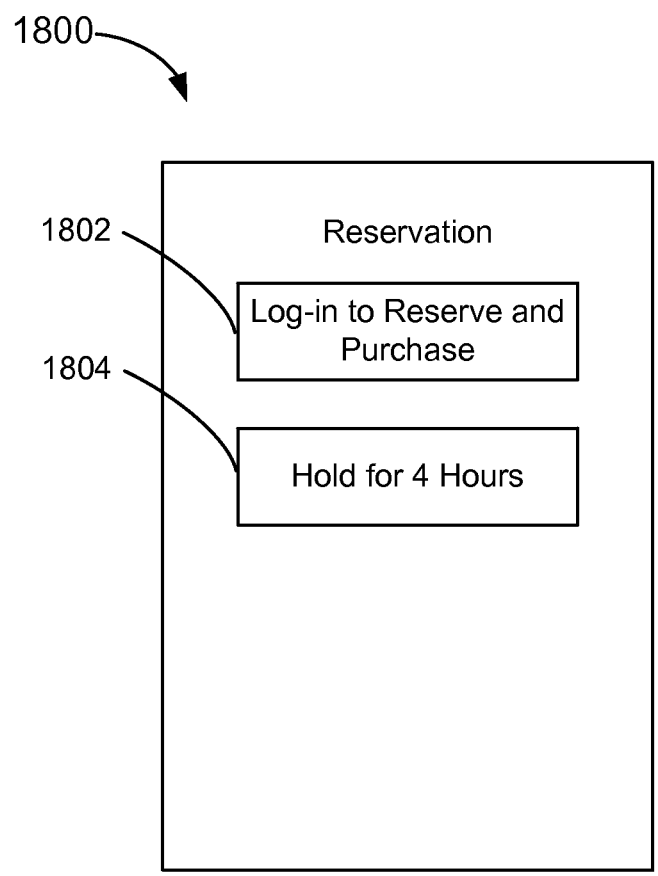
FIG. 18 shows an example user interface of a mobile application presented on a mobile device via which a consumer can opt to hold an item at a kiosk for a predetermined amount of time without purchasing the item.

FIG. 18 shows an example user interface of a mobile application presented on a mobile device via which a consumer can opt to hold an item at a kiosk for a predetermined amount of time without purchasing the item according to at least an embodiment. After the consumer selects an item, such as the Table model 200 for $75.99 at Kiosk B 1 mile away, the consumer may be provided with screenshot 1800 on the mobile application, or a similar webpage on the network site. The consumer may be presented with an option to "Log-In to Reserve and Purchase" 1802, or an option to merely hold the item for a pre-determined amount of time, for example, an option to "Hold for 4 Hours" 1804. When the consumer selects "Hold for 4 Hours" 1804, the item may held for that consumer for the pre-determined amount of time such that when that window of time elapses, the item is no longer reserved and may be purchased or reserved by another. For example, the Tablet model 200 for $75.99 may be reserved without processing any payment information or initiating any payment process until the consumer goes to initiate retrieval of the Tablet model 200 within 4 hours. However, if the consumer fails to initiate retrieval of the Tablet Model 200 within 4 hours, another consumer may reserve and purchase it.

Figure 19:
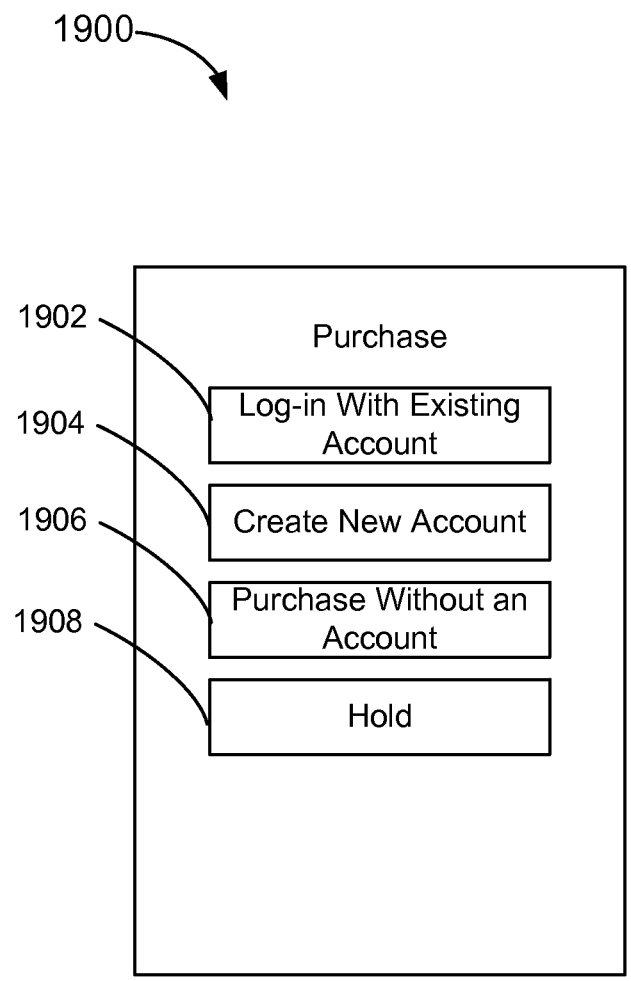
FIG. 19 shows an example user interface of a mobile application presented on a mobile device via which a consumer can select purchase options.

When the consumer selects "Log-In to Reserve and Purchase" 1802, then the screenshot 1900 of FIG. 19 may be provided to the consumer. FIG. 19 shows an example user interface of a mobile application presented on a mobile device via which a consumer can select purchase options. There may be multiple options for the consumer to purchase the requested item and initiate payment. One option may be to "Log-In With Existing Account" 1902. For example, as described previously, the consumer may be pre-registered with the kiosk management system and/or retailer providing the requested item. The consumer may select 1902 and log-in with his or her pre-registered account information, where a payment process is initiated with saved information associated with the consumer's registration, for example a saved credit card, billing address, etc. The consumer may also select to "Create New Account" 1904 if the consumer is not pre-registered and does not have an existing account with the kiosk management system and/or retailer. When selected to "Create New Account" 1904, the consumer may be prompted to provide various account and payment information that is saved with the kiosk management system and/or retailer. Another option may be purchase with a guest account and "Purchase Without an Account" 1906. The consumer may be prompted to provide payment information that is not saved for future transactions. Another option provided to the consumer may be "Hold" 1908, where the consumer is prompted to provide payment information, but the item is reserved without processing the payment information until retrieval is initiated, and then the payment process is initiated when the consumer goes to the kiosk to initiate retrieval of the requested item.

Figure 20:
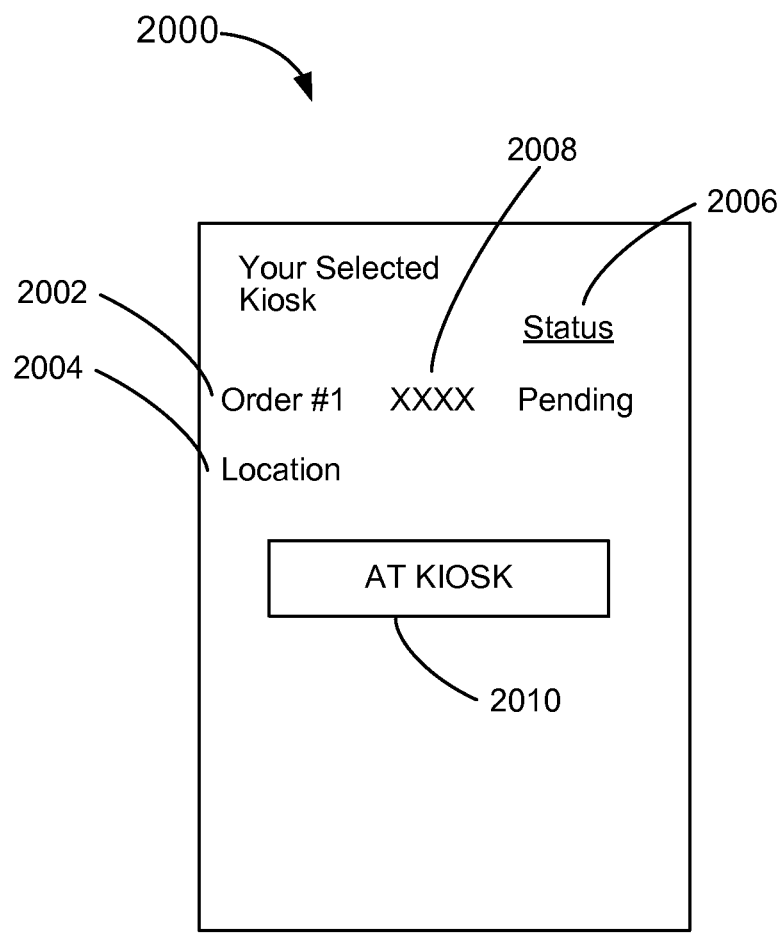
FIG. 20 shows an example user interface of a mobile application presented on a mobile device via which a consumer can indicate that he or she is at a kiosk to retrieve the item.

FIG. 20 shows an example user interface of a mobile application presented on a mobile device via which a consumer can indicate that he or she is at a kiosk to retrieve the item. After the purchase of the request item has been made, as shown in FIG. 11 or the item has been put on hold, the consumer may then proceed to the designated kiosk. An example screenshot 2000 may be provided to the consumer on his or her mobile device when initiating retrieval of the requested item at the kiosk. The screenshot 2000 may show an order number 2002, including the requested item and relevant item information 2008, a location 2004, and a status 2006 of the order. When the consumer is at the kiosk, the consumer may click on the "At Kiosk" 2010, and a code may be displayed on the mobile application on the mobile device (not shown). The code may be a quick response (QR) code, or any other matrix or two dimensional barcode, a one dimensional barcode, an alphanumeric code, or any other suitable code. The code may be scanned by the kiosk, or may be manually entered by the consumer into a screen interface or a keypad on the kiosk. The status 2006 of the order may be then change from "Pending" to "Ready for Pickup," or "Picked up at 7:30 PM Jul. 8, 2013." The status 2006 of order may be updated in real-time. For example, if the requested item needs to be delivered to the designated kiosk, the status may indicate "In Transit" before it is changed to "Ready for Pickup."

Figure 21:
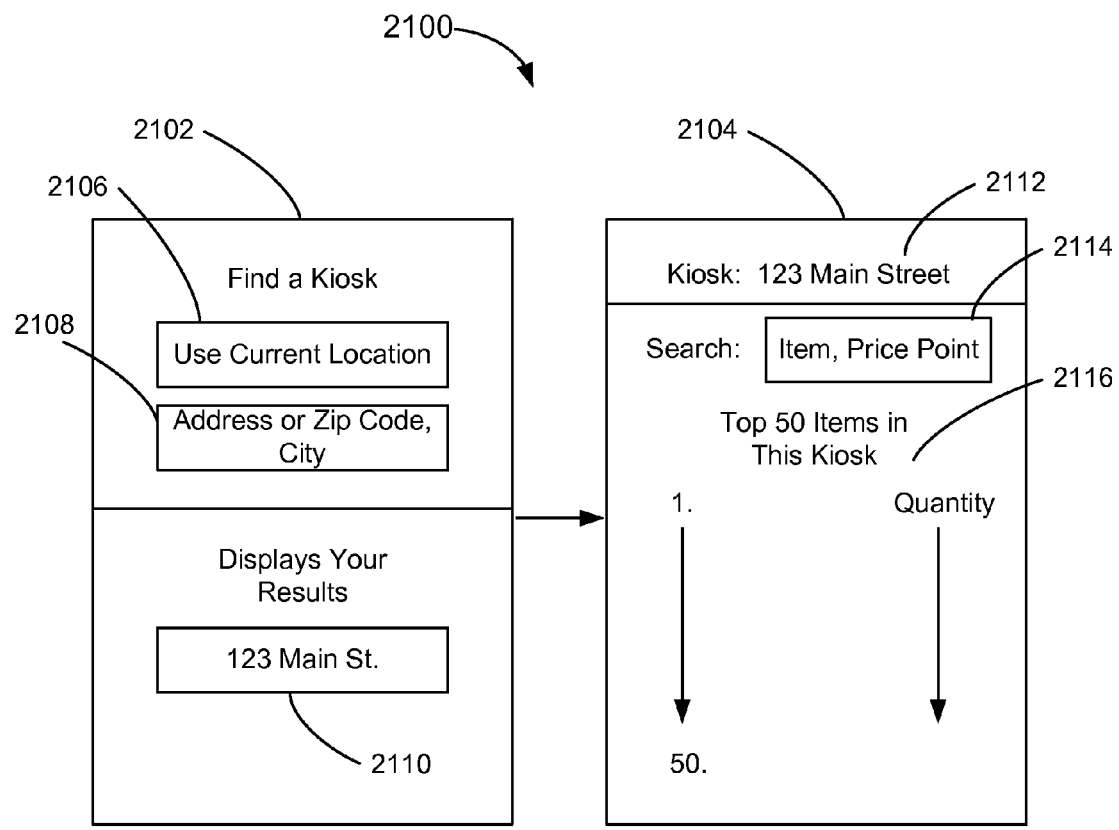
FIG. 21 shows example user interfaces of a mobile application presented on a mobile device via which a consumer may search for kiosks.

FIG. 21 shows example user interfaces of a mobile application presented on a mobile device via which a consumer may search for kiosks. In some instances, the consumer may not have a specific item or other search queries associated with the item. In an embodiment, the consumer may search for kiosks based on location. Screenshots 2100 show an example method of a consumer making a request for items based on location first. As shown in FIG. 21, in screenshot 2102, the consumer may wish to find the nearest kiosk. For example, the consumer may be visiting an aunt in another town the consumer is not familiar with, but would like to purchase a gift to bring to his or her aunt. The consumer may enter an address, zip code, or city, for example, his or her aunt's address or city. Alternatively, if on his or her mobile device, the consumer may select to "Use Current Location" 2106 to have his or her GPS location automatically detected. The nearest kiosk may then be displayed in 2110.

Subsequently, screenshot 2104 may be displayed when the consumer selects the resulting nearest kiosk (in this example, 123 Main St.). The screenshot 2104 may indicate the designated kiosk 2112, in this example, by displaying the address. In another embodiment, an identifier for the kiosk may be displayed, or location (e.g., Powell St. BART Station Kiosk). A list of the top items sold or requested in the kiosk may be listed in 2116. In the list 2116, the consumer may further provide search queries in Search Box 2114. The Item List 2116 may include the top 50 or 100 items, ranked by popularity, and include a quantity of each item stocked in the kiosk indicated in 2112. Other information, such as price, may be displayed. Further, the consumer may select an item to view additional details, such as reviews, images, and/or item description.

Figure 22:
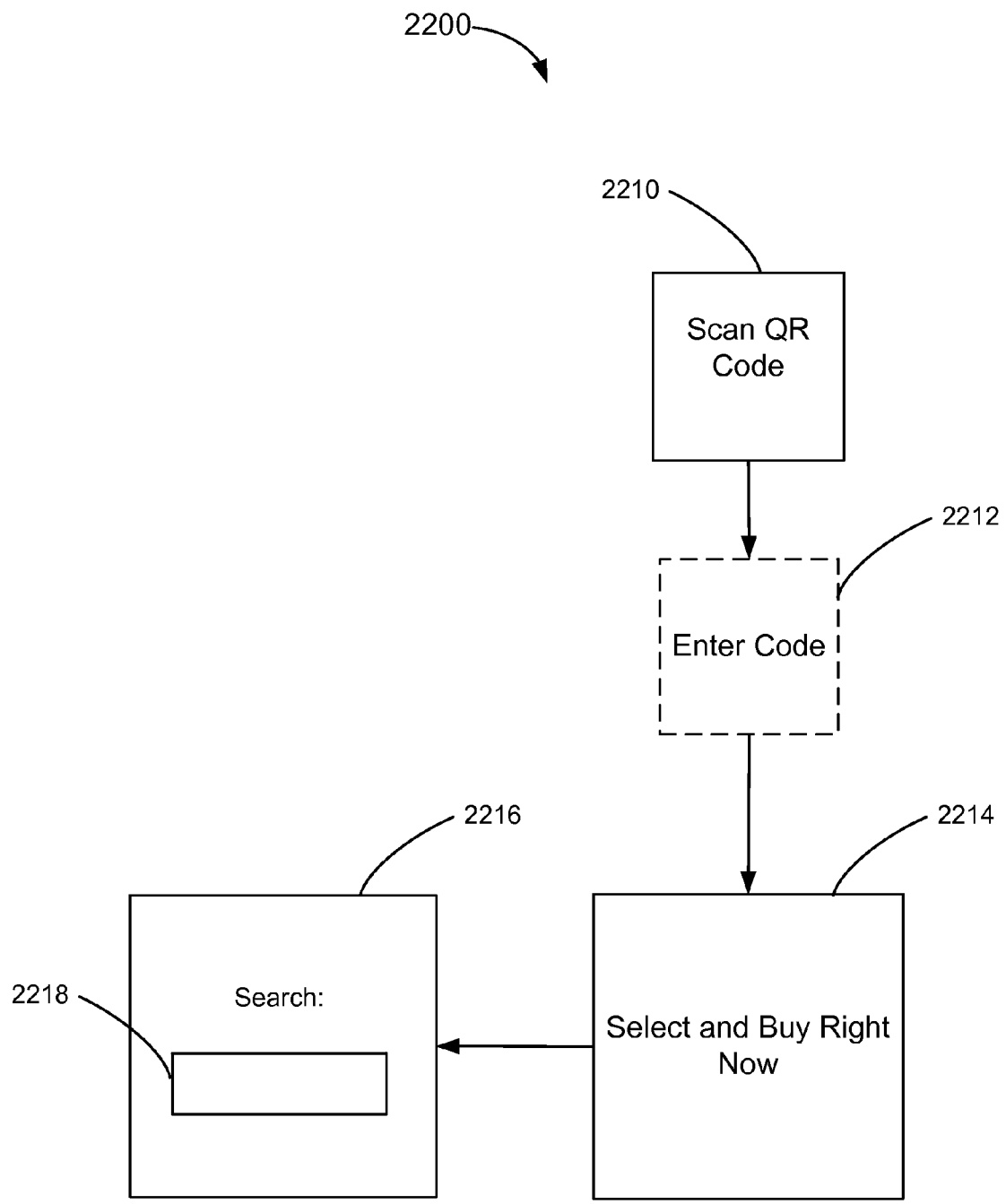
FIG. 22 shows an example user interface presented on a kiosk via which a consumer may scan or enter a code to initiate retrieval of the item from the kiosk.

Next, FIG. 22 shows an example user interface presented on a kiosk via which a consumer may scan or enter a code to initiate retrieval of the item from the kiosk. After the consumer has selected the item from list 2116, the consumer may receive a QR code or generated code and approach the kiosk indicated in 2112. The kiosk may display on a screen interface to "Scan QR Code" 2210. In another embodiment, the consumer may be prompted by the kiosk to "Enter Code" 2212, for example, if the generated code is a series of alphanumeric characters. The kiosk may be configured to scan other one and two-dimensional barcodes, or other suitable barcodes or images. The kiosk may then provide the consumer with options to "Select and Buy Right Now" 2214, and subsequently release and dispense the requested item(s) to the consumer. Alternatively, the consumer may elect to search again 2216 and be provide with a "Search Box" 2218 to provide search queries for items in designated kiosk that the consumer is interacting with or other kiosks. Alternatively, the consumer may be routed to the screenshot 2104 of FIG. 21, but displayed on the kiosk screen interface.

Many advantages and benefits are achieved by having the requested items delivered to a kiosk for a consumer or a recipient to pick up, as described herein in this disclosure. For example, with consolidated shipping to the network of kiosks involving a network of distribution agents, the kiosk management system and/or retailers can charge lower shipping rates for the consumer. Thus, consumers can get a lower total actual sales price on the item because the retailer or kiosk management system no longer needs to operate or pay for individual shipping to the home. Accordingly, the kiosk management system described herein provides efficient, cost-reducing, convenient, and stream-lined distribution of a variety of items to a multitude of consumers.

In current electronic transactions, many network retailers may offer free shipping if the consumer purchases special items or if the total amount of the purchase exceeds a minimum threshold. For example, a consumer may be offered free shipping only for promotional items (e.g., all shoe purchases for a particular brand ship for free), or the consumer may receive free shipping for all orders over $25. However, in the present disclosure, the consumer may request a singular item that may not exceed the minimum threshold for inclusive or automatic free shipping, but may receive a reduced shipping cost by electing to have the requested item delivered to a designated kiosk for pick-up instead of paying full shipping for it to be delivered individually to the consumer's home.

According to embodiments described herein, an end consumer (e.g., consumer, recipient) may be able to have a variety of items available for pick up at a customized designated location for a reduced shipping cost to the consumer. Reduced operations, inventory, and delivery costs to the kiosk management system and/or external retailer may also be significantly reduced. Further the kiosk management system and/or external retailer may offer a broader selection of items. For example, the consumer may not be limited to pre-stocked items that are determined for specific kiosks in particular locations based on transaction data analysis. The consumer may request any item that can be delivered, using distribution agents, to a designated kiosk of the consumer's choice, for a reduced shipping cost compared to if the consumer had the requested item delivered directly to his or her home.

Further, additional benefits to the consumer include leveraged partnerships between the kiosk management system and other entities at which kiosks may be located and maintained at. For example, promotions, such as coupons and discounts, may be provided for businesses at which kiosks are located at to incentivize consumers to select kiosks at the businesses. Additionally, businesses are incentivized to host and maintain kiosks for the kiosk management system as it may increase consumer flow to the business and potential transactions with the offered promotions.

The kiosk management system provides a sustainable business model with consumer conveniences and advantages to make shipping of a plurality of items more profitable to the kiosk management system and/or retailer while keeping shipping costs to the consumer low. Thus, a broad variety of items may be delivered to any consumer within reasonable parameters that the consumer, sellers/retailers and the kiosk management system with the use of distribution agents.

In a simplified example a distribution agent may be assigned to 100 kiosks in a designated geographical location. The distribution agent may be responsible for the delivery of pre-stocked items, such as a daily vitamin packet, to the 100 kiosks. It would be very costly for the kiosk management system, or a vitamin provider to provide individual vitamin packets to 100 kiosks within a local area, or to deliver hundreds of vitamin packets to a plurality of individual consumers who may or may not be within the same local area. Thus, the kiosk management system or vitamin provider may deliver a consolidated shipment of hundreds of vitamin packets to the distribution agent. The distribution agent may divide the shipment into the appropriate quantities for each of the 100 kiosks the distribution agent is assigned to maintain. For example, kiosks located in heavily trafficked areas may be stocked with more vitamin packets (e.g., downtown in a business-heavy area) than kiosks in more remote areas (e.g., residential suburbs).

The kiosk management system or retailer (e.g., vitamin provider) could never profitably deliver to every home of individual consumers or to the 100 individual kiosks with the varying inventories, so the entire shipments is consolidated to the distribution agent. As such, the distribution agent delivers the requested item to the "last mile."

In some embodiments when the requested item is included in the pre-stocked items that are typically available at some of the kiosks in the plurality of networked kiosks, the kiosk management system may provide the consumer with 24 hour convenience, spontaneous "on-the-spot" item purchases, and secure item pick up on millions of items for lower prices at a customized location convenient to the consumer.

In an alternative embodiment, an external retailer or seller may provider the items to be distributed by the kiosk management system. The sellers and retailers are also benefitted by the use of the plurality of networked kiosks and distribution agents, as sellers and retailers can provide a wide variety of items, including very low cost items, to be delivered to consumers over a wider range of locales without increasing their delivery and shipping operation costs.

The kiosk management system in conjunction with its sellers to provide a multitude of items, including low priced items that are typically too expensive to ship directly to the home of a consumer. The consumer can order one low priced item or a number of eligible pre-stocked items and have it sent to a designated kiosk. The kiosk management system may manage a plurality of networked kiosks, for example; including 20,000 kiosks over an expanded geographical location. The delivery of the requested items may be free to the consumer when the requested items are picked up at the consumer designated kiosk. The kiosk management system can scale this infrastructure and may be able to lower prices on millions of items because consolidated shipping of the items are delivered to individual distribution agents who work in the specific geographies and maintain/manage the plurality of kiosks managed by the kiosk management system.

The benefits appreciated and achieved by a kiosk of the plurality of networked kiosk to the consumer, according to at least one embodiment, include at least a wide variety and number of items available, pre-stocked and instantaneously to a consumer. The kiosk may be configured to hold hundreds of items of a specific size and weight. Additionally, with the infrastructure of a network of distribution agents to provide daily deliveries to individual kiosks and receive deliveries in a consolidated manner, passes shipping cost savings to the consumer by sharing shipping costs between the consumer and the kiosk management system and/or retailer, thus creating lower prices for the requested items. The kiosks also provide "on the spot" and on-demand high turn-around items in available empty spots in the storage area of the kiosk.

In additional embodiments, the kiosk may further provide suggestions and recommendations of these "on the spot" items for the consumer to additionally purchase while at the kiosk retrieving the original requested item. The kiosk allowed the consumer to have secure, 24 hour access to requested items and access to other items that are pre-stocked in the kiosk. Convenience to the consumer is also achieved by having the kiosks initiate payment processing directly with the kiosk management system, in which a pre-registered, existing consumer account may be used. Some embodiments may involve a mobile device, in which the consumer may utilize a mobile application operated on a mobile device to conduct transactions to request an item at a kiosk. In other embodiments, the request for requested items may be made over the Internet on a laptop, desktop computer, or other device capable of connecting to the Internet. The existing account of the consumer may be access by the mobile device, or on a desktop or laptop computing device, or any suitable device.

From a mobile device of the consumer, the consumer may be able to view and browse items in the mobile application operated on the mobile device and can search all kiosks to find a requested item. For example, a consumer may request medication for a baby at 2 am when all drugstores are closed, a razor at 9 pm when the consumer has landed in a new city for a business meeting, or a new tablet model that is the must have item and it is Christmas morning. Convenient locations of the kiosks may be in retail shopping centers, bank parking lots and gas stations—locations that may already be often frequented by consumers. Additionally, delivery to and pick up from the kiosk may be a negligible to the kiosk management system and/or retailer/seller such that the consumer essentially receives free delivery of the requested item(s).

Further features offered by the kiosk management system include the option for the consumer to request an item to a recipient as a gift for delivery to another kiosk in another location in real-time instantaneously. The recipient or consumer may be able to instantly order and pick up a requested item at a designated kiosk.

Additionally, consumers that are not registered with the kiosk management system or providing retailer may conduct a transaction. Thus, the consumer may not need to be pre-registered. As such, a consumer without a pre-registered account, a consumer visiting from another country, or a consumer without current access to his or her credit card can request items to a designated kiosk via the Internet or the mobile application, and pay cash for the requested item at the kiosk during pickup. The kiosks may be configured to accept cash payment for requested items and e-mail a receipt to the consumer. In an example, a kiosk may be co-located at a bank, and an ATM machine may be located near the kiosk to make cash payment for requested items convenient for consumers.

In another embodiment, the kiosk can co-promote with another business at its location. For example, if a consumer selects a kiosk outside a coffee shop, the kiosk management system may co-promote with the coffee shop to offer a promotion at the kiosk so that between 2 and 6 pm the kiosk can issue an e-mail or print a coupon for $2.00 off a drink ordered at that coffee shop when the consumer picks up his or her requested item.

Additionally, in another embodiment, and shown in FIG. 9, the kiosks may provide digital advertisements (e.g. Lighted Ads 902) that may be manipulated and customized remotely by the kiosk management system. The advertisements may be customized based on the location of the kiosk, current inventory of items, and/or transaction history and analysis of best-selling items at the designated kiosk. For example, if a particular item has ran out, such as umbrellas, the kiosk may manipulate its advertisements for a secondary, replacement item, such as ponchos. In another example, a kiosk located at a sports stadium may display more advertisements related to sports paraphernalia, bars/restaurants in the area, etc. In other embodiments, advertisements may be customized remotely and instantly based on environmental factors, such as geographical location, weather and time. For example, advertisements for a new book released may be shown during popular gifting holidays, such as Christmas.

In another embodiment, wireless (e.g., Wi-Fi) service may be offered at the kiosk so that a consumer may pay a fee to access a Wi-Fi hotspot at a kiosk. Free or reduced price Wi-Fi service could be provided to a consumer making a purchase through the kiosk. The consumer may pay for Wi-Fi service from the kiosk (monthly fee or one-time) and access the Internet nearby, for example, in his or her car in a parking lot of the location of the kiosk.

The benefits of kiosks in the kiosk management system according to at least one embodiment include the ability to distribute and provide a variety of items at low cost and additionally accept cash payments. Low shipping costs can be achieved by the kiosk management system providing efficient consolidated shipments to a distribution agent, who then may deliver the individual items to the individual plurality of kiosks.

Sales may be increased especially for low cost items that, if shipped individually directly to consumers' homes, may not profitably sell because of high shipping and operation costs associated with individual shipping of low priced items. Thus with the kiosks, low cost items may be distributed and sold to consumers in a secure manner. Even more shipping cost savings are appreciated with high cost items. Accordingly, embodiments and advantages achieved by embodiments can be extended to and appreciated by the distribution of both low and high cost items.

Further, individual kiosks may be placed and removed quickly. Kiosks may be placed in geographical locations that are more remote since they can operate autonomously without constant human supervision, unlike brick-and-mortar store locations needing large areas for construction and human intervention/operation. Alternatively, kiosks may be placed in locations that can provide convenient access to consumers 24 hours a day and 7 days a week, while store locations (e.g., brick-and-mortar retail locations) are limited by hours of operation. Thus the kiosk infrastructure may be updated and modified quickly and inexpensively to autonomously distribute a plurality of items to consumers. The kiosks may be conveniently placed with a variety of business, for example, creating partnerships with gas stations, coffee shops, convenient stores and banks to provide further services, discounts and convenient to the consumer. The kiosk management system can partner with large gas operators to give cents off a gallon of gas when a consumer uses the kiosk. Businesses hosting the kiosks may also benefit from increased business and visits from consumers retrieving items from the kiosks. In some embodiments, the merchants (e.g., businesses) and the kiosk management system may have a symbiotic relationship so that the merchant can act as a distribution agent for the kiosk management system to stock the kiosks, while the kiosk management system provides increased traffic and business to the merchant.

Figure 23:
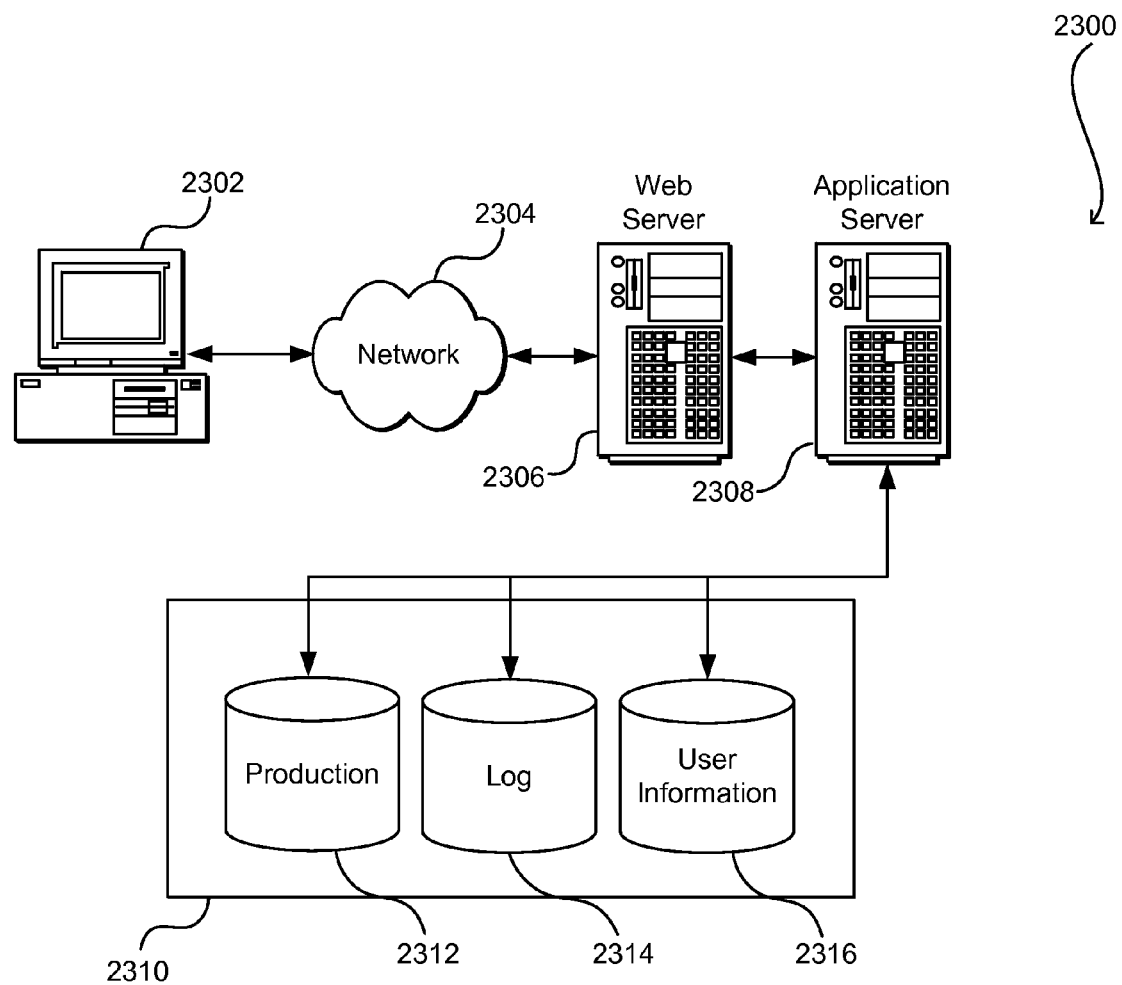
FIG. 23 shows an example computing environment for implementing aspects of the present disclosure in accordance with various embodiments.

Other applications of the kiosk management system may be extended and application to any suitable item, such as prescription drugs and health/beauty products. Independent pharmacy owners may operate as distribution agents and/or host kiosks, using kiosks as 24 hour pick up places for consumer to access products like a bottle of Tylenol, hair gel, brushes, etc. Immediate access and pick up at the kiosk may be faster than mail order and local to the area of the consumer. In an embodiment, the consumer can provide his or her prescription to the kiosk management system and/or pharmacy provider, thus offering the consumer's prescriptions FIG. 23 illustrates aspects of an example environment for implementing aspects in accordance with various embodiments. As will be appreciated, although a network-based environment is used for purposes of explanation, different environments may be used, as appropriate, to implement various embodiments. The environment includes an electronic client device 2302, which can include any appropriate device operable to send and receive requests, messages or information over an appropriate network 2304 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a network server 2306 for receiving requests and serving content in response thereto, although for other networks an alternative device serving a similar purpose could be used as would be apparent to one of ordinary skill in the art.

The illustrative environment includes at least one application server 2308 and a data store 2310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, data stores, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the network server in the form of Hyper-Text Markup Language ("HTML"), Extensible Markup Language ("XML") or another appropriate structured language in this example. The handling of all requests and responses, as well as the delivery of content between the client device 2302 and the application server 2308, can be handled by the network server. It should be understood that the network and application servers are not required and are merely example components, as structured code discussed herein can be executed on any appropriate device or host machine as discussed elsewhere herein.

The data store 2310 can include several separate data tables, data stores or other data storage mechanisms and media for storing data relating to a particular aspect. For example, the data store illustrated includes mechanisms for storing production data 2312 and user information 2316, which can be used to serve content for the production side. The data store also is shown to include a mechanism for storing log data 2314, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 2310. The data store 2310 is operable, through logic associated therewith, to receive instructions from the application server 2308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a network page that the user is able to view via a browser on the user device 2302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor device of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 23. Thus, the depiction of the system 2300 in FIG. 23 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and data store management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a network server, the network server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more network applications that may be implemented as one or more scripts or programs written in any programming language, such as Java®, C, C# or C++, or any scripting language, such as Perl, Python or TCL, as well as combinations thereof. The server(s) may also include data store servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
receiving, by one or more computer systems, an instruction to deliver a plurality of selected items to a distribution agent for pre-stocking a kiosk in a plurality of geographically distributed kiosks, wherein the distribution agent is assigned to pre-stock the kiosk;
instructing delivery of the plurality of items to the distribution agent for pre stocking the kiosk;
receiving information that an item has been requested that is excluded from the plurality of selected items with which the kiosk was pre-stocked by the distribution agent;
identifying a source for the requested item that is excluded;
instructing delivery of the requested item from the source to the distribution agent so that the distribution agent can stock the requested item in the kiosk, wherein the plurality of selected items are delivered to the distribution agent in plurality of deliveries, and wherein each of the plurality of deliveries are made a predetermined time apart; and
updating inventory information for the kiosk.

2. The computer-implemented method of claim 1, further comprising:
receiving a notification that an item, of the plurality of selected items with which the kiosk is pre-stocked, has been retrieved by a consumer from the kiosk; and
updating inventory information for the kiosk.

3. The computer-implemented method of claim 1, wherein identifying the source for the requested items that is excluded comprises:
determining that the requested item is unavailable from an internal source;
identifying an external source for the requested item;
transmitting a request to the external source for the requested item; and
instructing that the requested item be delivered to the distribution agent.

4. The computer-implemented method of claim 1, transmitting the inventory information to a kiosk management system.

5. The computer-implemented method of claim 1, the computer-implemented method further comprising:
when the requested item is excluded from the plurality of selected items with which the kiosk was pre-stocked by the distribution agent,
instructing that the requested item be included with a subsequent delivery of the plurality deliveries.

6. A computer-implemented method comprising:
under control of one or more computer systems configured with executable instructions,
generating an instruction to deliver a plurality of selected items to a distribution agent in a plurality of distribution agents, wherein the distribution agent is assigned to distribute the plurality of selected items to a plurality of kiosks on a periodic basis;
receiving information that an item has been requested that is excluded from the plurality of selected items distributed to the plurality of kiosks by the distribution agent:
identifying a source for the requested item excluded from the plurality of selected items;
generating an instruction to deliver the requested item to the distribution agent for further distribution of the requested item to a selected kiosk; and
updating inventory information for the selected kiosk.

7. The computer-implemented method of claim 6, further comprising:
when an item included in the plurality of selected items distributed to the plurality of kiosks by the distribution agent is requested and retrieved from a kiosk of the plurality of kiosks:
updating the inventory information for the kiosk to show that the requested item is no longer in inventory at the kiosk.

8. The computer-implemented method of claim 6, further comprising:
when an item included in the plurality of selected items distributed to the plurality of kiosks by the distribution agent is requested, but not retrieved from a kiosk of the plurality of kiosks within a predetermined window of time for retrieval,
updating the inventory information for the kiosk to show that requested item remains in inventory at the kiosk.

9. The computer-implemented method of claim 6, further comprising:
when the item excluded from the plurality of selected items distributed to the plurality of kiosks by the distribution agent is not retrieved from the selected kiosk within a predetermined window of time for retrieval,
receiving a notification that the item has been removed from the selected kiosk by the distribution agent; and
updating the inventory information for the kiosk to show that the item is no longer in inventory at the kiosk.

10. The computer-implemented method of claim 6, wherein the distribution agent is assigned to distribute the plurality of selected items to the plurality of kiosks, including the selected kiosk, based at least in part on a predetermined proximity to the plurality of kiosks and the selected kiosk.

11. A system comprising:
a data store configured to store inventory information for a plurality of items; and
a computing device comprising a processor device and a memory, the computing device in communication with the data store and configured to at least:
receive a selection of items to be stored in a plurality of kiosks, wherein the items were selected for storage in the kiosks based at least in part on at least one of the inventory information, transaction history information, and kiosk information;
select a subset of kiosks in the plurality of kiosks in which to store the items;
identify a distribution agent assigned to the subset of kiosks;
transmit a delivery message to the distribution agent, the delivery message identifying the subset of kiosks, and identifying the selection of items and a quantity for each of the items to be distributed to each kiosk in the subset of kiosks;
instruct delivery of the quantity for each of the items to the distribution agent;
receive a message from the distribution agent confirming distribution of the selection of items to a kiosk of the subset of kiosks; and
update the inventory information for the kiosk.

12. The system of claim 11, wherein the kiosk is associated with a preferred item provider.

13. The system of claim 11, wherein computing device is further configured to at least:
receive inventory information for the kiosk from the distribution agent, wherein the inventory information includes transaction information associated with an item stored in the kiosk.

14. The system of claim 11, wherein the computing device is further configured to transmit inventory information to a kiosk management system.

15. A non-transitory computer-readable medium storing computer-executable instructions that, when executed by a computer system, configure the computer system to perform operations comprising:
for each of a plurality kiosks located in a geographic area,
maintaining inventory information for a plurality of items stored in the kiosk, wherein the plurality of items were selected for storage in the kiosk based at least in part on at least one of the inventory information, transaction history information, and kiosk information; and wherein the plurality of items were distributed to the kiosk by a distribution agent assigned to the kiosk based at least in part on the geographic area;
when an item of the plurality of items stored in the kiosk is purchased, and retrieved by a consumer from the kiosk, updating the inventory information for the kiosk to reflect that the item is no longer stored in the kiosk; and
transmitting the updated inventory information to a kiosk management system;
when a predetermined period of time for retrieval of an item from the kiosk has elapsed,
receiving a notification that the item has been removed from the selected kiosk by the distribution agent; and
updating the inventory information for the kiosk to show that the item is no longer in inventory at the kiosk.

16. The computer-readable medium of claim 15, wherein the operations further comprise, after the item is no longer in the kiosk, instructing creation of a shipment of a replacement item for the kiosk.

17. The computer-readable medium of claim 15,
wherein the operations further comprise, after the item is no longer in the kiosk, instructing re-stocking of a replacement item into the kiosk.

18. The computer-readable medium of claim 15, wherein the operations further comprise:

determining an inventory status of a subset of items provided by the kiosk;
updating a subset of inventory records for the subset of items provided by the kiosk; and
transmitting the updated subset of inventory records for the subset of items provided by kiosk to the kiosk management system.

19. The computer-readable medium of claim 15, wherein the operations further comprise:
assigning the distribution agent to the kiosk; and
instructing creation of a shipment of the plurality of items for delivery to the distribution agent.

* * * * *